(12) United States Patent
Saito et al.

(10) Patent No.: US 10,138,323 B2
(45) Date of Patent: Nov. 27, 2018

(54) HIGHLY BRANCHED POLYMER AND DISPERSANT FOR CARBON NANOTUBES

(75) Inventors: Daigo Saito, Funabashi (JP); Tatsuya Hatanaka, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 1042 days.

(21) Appl. No.: 14/119,798

(22) PCT Filed: May 25, 2012

(86) PCT No.: PCT/JP2012/063454
§ 371 (c)(1),
(2), (4) Date: Nov. 22, 2013

(87) PCT Pub. No.: WO2012/161307
PCT Pub. Date: Nov. 29, 2012

(65) Prior Publication Data
US 2014/0080971 A1    Mar. 20, 2014

(30) Foreign Application Priority Data

May 25, 2011    (JP) ................ 2011-117258

(51) Int. Cl.
| | | |
|---|---|---|
| C08G 12/08 | (2006.01) | |
| C08L 61/22 | (2006.01) | |
| C08G 73/02 | (2006.01) | |
| H01B 1/24 | (2006.01) | |
| B82Y 30/00 | (2011.01) | |
| C08G 12/40 | (2006.01) | |
| C08L 61/32 | (2006.01) | |
| B82Y 40/00 | (2011.01) | |
| C01B 32/174 | (2017.01) | |
| C08K 3/04 | (2006.01) | |
| C01B 32/176 | (2017.01) | |

(52) U.S. Cl.
CPC .............. *C08G 12/08* (2013.01); *B82Y 30/00* (2013.01); *B82Y 40/00* (2013.01); *C01B 32/174* (2017.08); *C01B 32/176* (2017.08); *C08G 12/40* (2013.01); *C08G 73/026* (2013.01); *C08K 3/041* (2017.05); *C08L 61/32* (2013.01); *H01B 1/24* (2013.01)

(58) Field of Classification Search
CPC ............ C08G 12/08; G02B 5/22; C08L 61/22
USPC ............ 359/885; 528/242; 524/597
See application file for complete search history.

(56) References Cited

U.S. PATENT DOCUMENTS

| | | | |
|---|---|---|---|
| 3,474,054 A | 10/1969 | White | |
| 4,200,729 A | 4/1980 | Calbo | |
| 4,251,665 A | 2/1981 | Calbo | |
| 5,187,019 A | 2/1993 | Calbo et al. | |
| 6,576,341 B1 | 6/2003 | Davey et al. | |
| 7,682,590 B2 | 3/2010 | Sakakibara et al. | |
| 9,123,893 B2 * | 9/2015 | Hida | B01F 17/005 |
| 2007/0082965 A1 | 4/2007 | Yasuda et al. | |
| 2007/0213450 A1 | 9/2007 | Winey et al. | |
| 2008/0153991 A1 | 6/2008 | Park et al. | |

(Continued)

FOREIGN PATENT DOCUMENTS

| | | |
|---|---|---|
| JP | 10-302963 A | 11/1998 |
| JP | 2000-44216 A | 2/2000 |

(Continued)

OTHER PUBLICATIONS

International Search Report issued in PCT/JP2012/063453 dated Aug. 7, 2012.

(Continued)

*Primary Examiner* — Deve E Valdez
(74) *Attorney, Agent, or Firm* — Birch, Stewart, Kolasch & Birch, LLP

(57) ABSTRACT

A highly branched polymer comprising repeating units which each have an acid group such as sulfo group, said repeating units being represented by formula [1] or the like, and a dispersant for carbon nanotubes (CNTs) which comprises the highly branched polymer can disperse CNTs in a medium such as an organic solvent to the individual sizes and can yield thin films having improved conductivity.

[1]

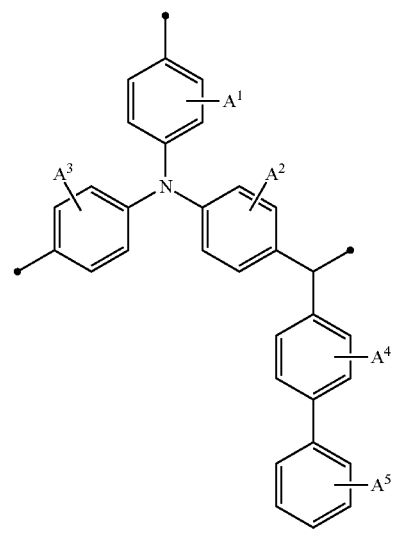

In formula [1], any one of $A^1$ to $A^5$ is a sulfo group, and the others are each a hydrogen atom.

23 Claims, 6 Drawing Sheets

(56) References Cited

U.S. PATENT DOCUMENTS

| | | | |
|---|---|---|---|
| 2010/0133483 A1* | 6/2010 | Nakashima | B82Y 30/00 252/511 |
| 2010/0136343 A1 | 6/2010 | Chang et al. | |
| 2011/0294013 A1 | 12/2011 | Bosnyak et al. | |
| 2012/0077345 A1 | 3/2012 | Saito et al. | |
| 2012/0268840 A1 | 10/2012 | Hida et al. | |
| 2014/0083752 A1 | 3/2014 | Walczak et al. | |

FOREIGN PATENT DOCUMENTS

| | | |
|---|---|---|
| JP | 2001-255566 A | 9/2001 |
| JP | 2005-162877 A | 6/2005 |
| JP | 2007-56125 A | 3/2007 |
| JP | 2008-24522 A | 2/2008 |
| JP | 2008-116569 A | 5/2008 |
| JP | 2009-227934 A | 10/2009 |
| JP | 2009-242145 A | 10/2009 |
| JP | 2010-509428 A | 3/2010 |
| JP | 2010-163568 A | 7/2010 |
| JP | 2010-163570 A | 7/2010 |
| WO | WO 2008/139839 A1 | 11/2008 |
| WO | WO 2010/147155 A1 | 12/2010 |
| WO | WO 2011/065395 A1 | 6/2011 |

OTHER PUBLICATIONS

Japanese Office Action dated Apr. 19, 2016, for Japanese Application No. 2013-516454.

Extended European Search Report, dated Aug. 7, 2015, for European Application No. 12790303.7.

Dettlaff-Weglikowska et al., "Effect of SOCl2 Treatment on Electrical and Mechanical Properties of Singled-Wall Carbon Nanotube Networks", J. Am. Chem. Soc., 2005, vol. 127, No. 14, p. 5125-5131.

International Search Report, issued in PCT/JP2012/063454, dated Aug. 28, 2012.

Lee et al., "Conductivity enhancement in single-walled carbon nanotube bundles doped with K and Br", Nature, Jul. 17, 1997, vol. 388 (6639), p. 255-257.

* cited by examiner

HIGHLY BRANCHED POLYMER AND DISPERSANT FOR CARBON NANOTUBES

TECHNICAL FIELD

The present invention relates to a dispersant for carbon nanotubes, and more particularly to a carbon nanotube dispersant composed of a highly branched polymer having a triarylamine structure as the branch points. The invention relates also to a carbon nanotube-containing composition which includes such a dispersant.

BACKGROUND ART

Carbon nanotubes (also abbreviated below as "CNTs") are being studied for potential use in a wide range of fields as a key nanotechnology material. Applications are broadly divided into methods which involve the use of individual CNTs themselves as transistors, microscope probes and the like, and methods which involve the collective use of a large number of CNTs in bulk, such as in electron emission electrodes, fuel cell electrodes, and electrically conductive composites in which CNTs are dispersed.

In cases where individual CNTs are employed, use is made of, for example, a method in which CNTs are added to a solvent and the mixture is ultrasonically irradiated, following which only the CNTs that are individually dispersed are removed by a technique such as electrophoresis.

On the other hand, in an electrically conductive composite which uses CNTs in bulk, it is essential for the CNTs to be properly dispersed in the polymer or the like that serves as the matrix material.

However, CNTs generally are difficult to disperse. Because conventional composites are used with CNT dispersion therein incomplete, the attributes of the CNTs are probably not fully manifested.

Moreover, this problem also has something to do with making various applications of CNTs difficult to achieve. Hence, various methods for enhancing dispersibility which entail, for example, the surface modification of CNTs or chemically modifying the CNT surfaces, are being investigated.

One such method for dispersing CNTs involves depositing poly((m-phenylene vinylene)-co-(dioctoxy-p-phenylene vinylene)) having a coil-like structure on the CNT surface (see, for example, Patent Document 1).

Although the foregoing publication shows that it is possible to individually disperse CNTs within an organic solvent and that the polymer is deposited on single CNTs, once dispersion has been carried out to a certain degree, aggregation arises and the CNTs are captured as precipitate. Hence, it has not been possible to maintain CNTs in a dispersed state for a long time.

Methods that have been proposed for resolving the above problem include using poly(vinyl pyrrolidone) to disperse CNTs in an amide-based polar organic solvent (see, for example, Patent Document 2), and using poly(vinyl pyrrolidone) to disperse CNTs in an alcohol-type organic solvent (see, for example, Patent Document 3).

However, in the foregoing art, the polymer used as the dispersant is characterized by being a straight-chain polymer; no findings concerning highly branched polymer have been reported.

Methods that focus on highly branched polymers as the CNT dispersant have also been disclosed (see, for example, Patent Document 4). Here, "highly branched polymer" refers to a polymer having branches within the skeleton, such as star polymers, and also dendrimers and hyperbranched polymers, both of which are categorized as dendritic polymers.

These highly branched polymers exhibit distinctive shapes which, in contrast with conventional polymers of ordinary string-like shape, exhibit distinctive shapes that have a relatively sparse interior and a particle-like on the ground that branches are deliberately introduced, and also have a large number of ends that can be modified by the introduction of various functional groups. By utilizing these characteristics, there is a possibility of dispersing CNTs to a high degree compared with straight-chain polymers.

However, in the art of Patent Document 4 which uses the above-described highly branched polymer as a dispersant, in addition to mechanical treatment, thermal treatment is also required in order to maintain the individually dispersed state of the CNTs for an extended period of time. Moreover, the ability to disperse CNTs is not all that high.

Also, in the art of Patent Document 4, the yield when synthesizing the dispersant is low. Because a large amount of metal catalyst must be used as a coupling agent in order to improve the yield, there is a risk of residual metal ingredients remaining within the highly branched polymer, which may limit use in applications as composites with CNTs.

Moreover, it is known that the electrical conductivity can be improved by doping the CNTs with bromine, potassium, water, nitric acid or sulfuric acid (see, for example, Non-Patent Document 1), and that the electrical characteristics and the mechanical characteristics can be improved by doping with thionyl chloride (see, for example, Non-Patent Document 2).

However, stably increasing the electrical conductivity has been difficult because these dopants often volatize or decompose under elevated temperature or migrate within the composition.

One approach that has been proposed for resolving such problems involves using the ion-conductive resin Nafion® to disperse the CNTs (see, for example, Patent Document 5).

However, although Nafion® exhibits a relatively high conductance, it does not have such a high ability to disperse CNTs.

PRIOR ART DOCUMENTS

Patent Documents

Patent Document 1: JP-A 2000-44216
Patent Document 2: JP-A 2005-162877
Patent Document 3: JP-A 2008-24522
Patent Document 4: International Disclosure WO 2008/139839
Patent Document 5: JP-A 2010-509428

Non-Patent Documents

Non-Patent Document 1: Lee et al., Nature 388 (6639), p. 255 (1997)
Non-Patent Document 2: U. Dettlaff-Weglikowska et al., J. Am. Chem. Soc., Vol. 127, No. 14, p. 5125 (2005)

SUMMARY OF THE INVENTION

Problems to be Solved by the Invention

It is therefore an object of the invention to provide a highly branched polymer which is able to disperse CNTs to an individual size within a medium such as an organic solvent, and which, when rendered into a thin-film, also is capable of improving the electrical conductivity of the thin-film. A further object of the invention is to provide a carbon nanotube dispersant composed of such a highly branched polymer.

Means for Solving the Problems

The inventors have already discovered that highly branched polymers containing triarylamine structures as branch points have an excellent ability to disperse CNTs and that when such a highly branched polymer is used as a CNT dispersant, at least some of the CNTs can be dispersed to an individual size without heating treatment (PCT/JP2010/70973).

Based on this finding, the inventors have conducted further extensive investigations, as a result of which they have found that by introducing acidic groups that become proton-donating sources into the highly branched polymer, the electrical conductivity of the thin-film can be improved while retaining the ability to disperse CNTs.

Accordingly, the invention provides:
1. A highly branched polymer characterized by having repeating units of formula (1) or formula (2) below

[Chemical Formula 1]

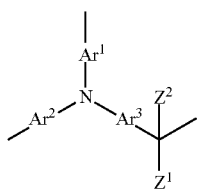
(1)

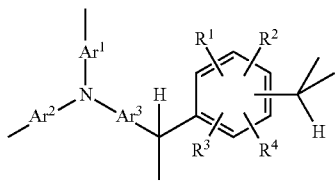
(2)

(wherein $Ar^1$ to $Ar^3$ are each independently a divalent organic group of any one of formulas (3) to (7) below

[Chemical Formula 2]

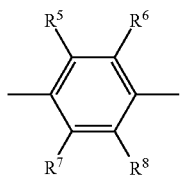
(3)

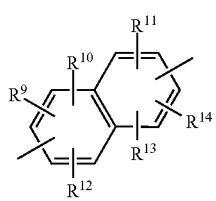
(4)

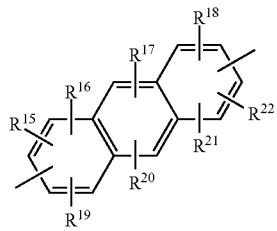
(5)

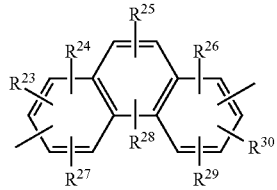
(6)

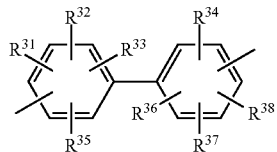
(7)

(in which $R^5$ to $R^{38}$ are each independently a hydrogen atom, a halogen atom, an alkyl group of 1 to 5 carbons which may have a branched structure, an alkoxy group of 1 to 5 carbons which may have a branched structure, or a carboxyl group, sulfo group, phosphoric acid group, phosphonic acid group or salt of any thereof); $Z^1$ and $Z^2$ are each independently a hydrogen atom, an alkyl group of 1 to 5 carbons which may have a branched structure, or a monovalent organic group of any one of formulas (8) to (11) below

[Chemical Formula 3]

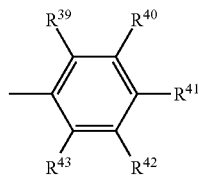
(8)

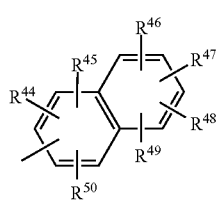
(9)

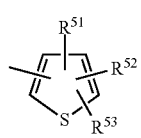
(10)

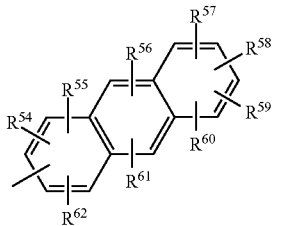

(in which $R^{39}$ to $R^{62}$ are each independently a hydrogen atom, a halogen atom, an alkyl group of 1 to 5 carbons which may have a branched structure, a haloalkyl group of 1 to 5 carbons which may have a branched structure, a phenyl group, $OR^{63}$, $COr^{63}$, $Nr^{63}R^{64}$, $COOR^{65}$ ($R^{63}$ and $R^{64}$ being each independently a hydrogen atom, an alkyl group of 1 to 5 carbons which may have a branched structure, a haloalkyl group of 1 to 5 carbons which may have a branched structure, or a phenyl group; and $R^{65}$ being an alkyl group of 1 to 5 carbons which may have a branched structure, a haloalkyl group of 1 to 5 carbons which may have a branched structure, or a phenyl group), or a carboxyl group, sulfo group, phosphoric acid to group, phosphonic acid group or salt of any thereof)), with the proviso that $Z^1$ and $Z^2$ are not both alkyl groups; and $R^1$ to $R^4$ in formula (2) are each independently a hydrogen atom, a halogen atom, an alkyl group of 1 to 5 carbons which may have a branched structure, an alkoxy group of 1 to 5 carbons which may have a branched structure, or a carboxyl group, sulfo group, phosphoric acid group, phosphonic acid group or salt of any thereof; with the proviso that at least one type of acidic group selected from among carboxyl groups, sulfo groups, phosphoric acid groups, phosphonic acid groups, and salts thereof is present on at least one aromatic ring of the repeating unit of formula (1) or (2));

2. The highly branched polymer of 1 above, wherein the repeating units are of formula (12) below

[Chemical Formula 4]

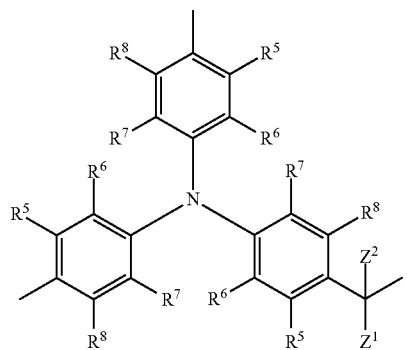

(wherein $R^5$ to $R^8$ are hydrogen atoms, carboxyl groups, sulfo groups, phosphoric acid groups, phosphonic acid groups, or salts thereof; and $Z^1$ and $Z^2$ are as defined above);

3. The highly branched polymer of 1 or 2 above, wherein $Z^2$ is a hydrogen atom;

4. The highly branched polymer of 3 above, wherein $Z^1$ is a hydrogen atom, a thienyl group, or a monovalent organic group of formula (8);

5. The highly branched polymer of any one of 1 to 4 above, wherein the acidic group is a sulfo group or a salt thereof;

6. The highly branched polymer of any one of 1 to 5 above which has a polystyrene-equivalent weight-average molecular weight, as measured by gel permeation chromatography, of from 1,000 to 2,000,000;

7. A film-forming composition containing the highly branched polymer according to any one of 1 to 6 above;

8. A film containing the highly branched polymer according to any one of 1 to 6 above;

9. A carbon nanotube dispersant composed of the highly branched polymer according to any one of 1 to 6 above;

10. A composition which includes the carbon nanotube dispersant of 9 above and carbon nanotubes;

11. The composition of 10 above, wherein the carbon nanotube dispersant adheres to surfaces of the carbon nanotubes and forms composite bodies;

12. The composition of 10 or 11 above which further includes an organic solvent;

13. The composition of 12 above, wherein the carbon nanotubes are individually dispersed in the organic solvent;

14. The composition of 12 above, wherein the composite bodies are individually dispersed in the organic solvent;

15. The composition of any one of 10 to 14 above, wherein the carbon nanotubes are of at least one type selected from among single-walled carbon nanotubes, double-walled carbon nanotubes and multi-walled carbon nanotubes;

16. The composition of any one of 12 to 15 above which further includes a crosslinking agent that is soluble in the organic solvent;

17. The composition of 16 above which further includes an acid and/or an acid generator;

18. A thin-film obtained from the composition of any one of 10 to 17 above;

19. A cured film obtained by heat-treating the thin-film obtained from the composition of 16 or 17 above;

20. A method of producing a composition, which method includes the steps of: preparing a mixture by mixing together the carbon nanotube dispersant of 9 above, carbon nanotubes and an organic solvent; and mechanically treating the mixture;

21. The production method of 20 above which includes the steps of: preparing the mixture by adding the carbon nanotubes to a solution obtained by dissolving the carbon nanotube dispersant in the organic solvent; and mechanically treating the mixture; and 22. A method of producing a composition, the method being characterized by including the step of forming a composite by melt-blending the carbon nanotube dispersant of 9 above, carbon nanotubes and a thermoplastic resin.

Advantageous Effects of the Invention

The highly branched polymer of the invention is able to provide a film which exhibits a high refractive index, a high transparency and a high heat resistance. Moreover, because the polymer has acidic groups such as suite groups on the skeleton, it is able to provide a film having also an improved electrical conductivity.

Such films can be advantageously used as components in the fabrication of electronic devices such as liquid-crystal displays, organic electroluminescent (EL) displays, optical semiconductor (LED) devices, solid-state image sensors, organic thin-film solar cells, dye-sensitized solar cells and organic thin-film transistors (TFT).

In particular, such films can be advantageously used as the following solid-state image sensor components which are required to have especially high refractive indices: embedding films and planarizing films on photodiodes, planarizing films before and after color filters, microlenses, planarizing films on microlenses, and conformal films.

In addition, the highly branched polymer of the invention, because it includes triarylamine structures as branch points, has an excellent CNT dispersing ability and is able to individually disperse CNTs to an individual size without heating treatment.

Therefore, by using a dispersant composed of the highly branched polymer of the invention, at least some of the CNTs can be separated to an individual size (diameter, 0.4 to 100 nm) and dispersed stably (that is, without allowing aggregation to take place) within an organic solvent in an individually dispersed state. In this invention, "individually dispersed" refers to a state in which the individual CNTs have scattered and are dispersed throughout the medium without forming into masses, bundles or "ropes" due to cohesive forces therebetween.

Moreover, the CNTs can be dispersed by merely subjecting the solution containing CNTs and the organic solvent to mechanical treatment such as ultrasonic treatment, enabling additional operations such as heat treatment to be omitted during dispersion and also making it possible to shorten the treatment time.

Therefore, by using the CNT dispersant of the invention, it is possible to easily obtain a CNT-containing composition in which (at least some of) the CNTs are dispersed in an individually dispersed state.

Furthermore, a thin-film can be easily formed by merely applying the CNT-containing composition obtained in this invention to a substrate, and the resulting thin-film exhibits a high electrical conductivity. Moreover, in the above composition, adjusting the amount of CNTs according to the intended use is easy, enabling the composition to be advantageously used in a broad range of applications as various types of semiconductor materials and conductor materials.

BRIEF DESCRIPTION OF THE DIAGRAMS

EMBODIMENT FOR CARRYING OUT THE INVENTION

Figure 1:
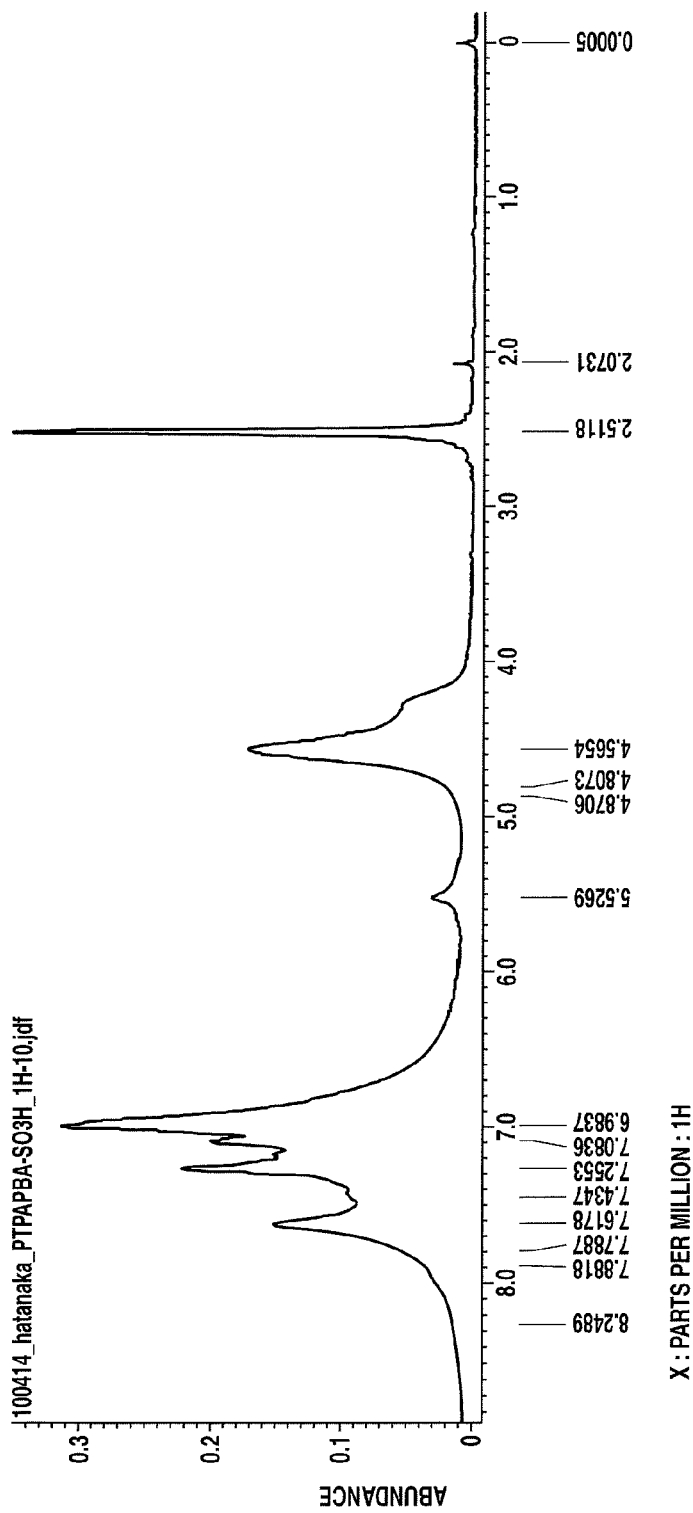
FIG. 1 is an $^1$H-NMR spectrum of the PTPA-PBA-SO$_3$H obtained in Example 1.

The invention is described more fully below.

The highly branched polymers shown in above formula (1) and (2) according to the invention are polymers containing triarylamine structures as the branch points. More specifically, they are polymers obtained by the condensation polymerization of triarylamines with aldehydes and/or ketones under acidic conditions.

These highly branched polymers, because they are thought to exhibit a high affinity to the conjugated structure of CNTs via π-π interactions originating in the aromatic rings of the triarylamine structures, are expected to have a high ability to disperse CNTs. In addition, they have such characteristics as the potential, depending on the combination of the above triarylamines with the comonomer(s) selected from among aldehydes and/or ketones and on the conditions of polymer synthesis, for the design of various skeletons, the introduction of functional groups, the control of molecular weight and distribution, and the conferring of functionality. Moreover, because these highly branched polymers have a branched structure and are thus endowed with a high solubility that is not observed in straight-chain polymers, and because they also have an excellent heat stability and exhibit excellent hole transporting properties, they show promise also for use as organic EL materials.

The average molecular weight of the highly branched polymer is not particularly limited, although the weight-average molecular weight is preferably from 1,000 to 2,000,000. If the polymer has a weight-average molecular weight below 1,000, there is a risk that its ability to disperse CNTs will markedly decrease or that such an ability may cease to be exhibited. On the other hand, at a weight-average molecular weight greater than 2,000,000, handling of the polymer in dispersion treatment may become very difficult. A polymer having a weight-average molecular weight of from 2,000 to 1,000,000 is more preferred.

The weight-average molecular weight of the invention is a measured value (polystyrene equivalent) obtained by gel permeation chromatography.

In above formulas (1) and (2), $Ar^1$ to $Ar^3$ are each independently a divalent organic group of any one of above formulas (3) to (7). A substituted or unsubstituted phenylene group of formula (3) is especially preferred.

In above formulas (2) to (7), $R^1$ to $R^{38}$ are each independently a hydrogen atom, a halogen atom, an alkyl group of 1 to 5 carbons which may have a branched structure, an alkoxy group of 1 to 5 carbons which may have a branched structure, or a carboxyl group, sulfo group, phosphoric acid group, phosphonic acid group or salt of any thereof.

Here, examples of the halogen atom include fluorine, chlorine, bromine and iodine atoms.

Examples of the alkyl group of 1 to 5 carbons which may have a branched structure include methyl, ethyl, n-propyl, isopropyl, n-butyl, sec-butyl, tert-butyl and n-pentyl.

Examples of the alkoxy group of 1 to 5 carbons which may have a branched structure include methoxy, ethoxy, n-propoxy, isopropoxy, n-butoxy, sec-butoxy, tert-butoxy and n-pentoxy.

Salts of carboxyl groups, sulfo groups, phosphoric acid groups and phosphonic acid groups include sodium, potassium and other alkali metal salts; magnesium, calcium and other alkaline earth metal salts; ammonium salts; propylamine, dimethylamine, tri-$C_{1-10}$ alkylamine (e.g., triethylamine, tri-n-propylamine, tri-n-butylamine, tri-n-pentylamine, tri-n-hexylamine, tri-n-heptylamine, tri-n-octylamine, tri-n-nonylamine, tri-n-decylamine), ethylenediamine and other aliphatic amine salts; imidazoline, piperazine, morpholine and other cyclic amine salts; aniline, diphenylamine and other aromatic amine salts; and pyridinium salts.

In formulas (1) and (2), $Z^1$ and $Z^2$ are each independently a hydrogen atom, an alkyl group of 1 to 5 carbons which may have a branched structure, or a monovalent organic group of any of above formulas (8) to (11), with the proviso that $Z^1$ and $Z^2$ are not both alkyl groups. It is preferable for $Z^1$ and $Z^2$ to be each independently a hydrogen atom, a 2- or 3-thienyl group, or a group of formula (8) above. It is more preferable for one of $Z^1$ and $Z^2$ to be a hydrogen atom and for the other to be a hydrogen atom, a 2- or 3-thienyl group or a group of formula (8) above, with one in which $R^{41}$ is a phenyl group or one in which $R^{41}$ is a methoxy group being especially preferred.

When $R^{41}$ is a phenyl group, in cases where, in the subsequently described acidic group introduction method, acidic groups are introduced onto the polymer following polymer synthesis, the acidic groups are sometimes introduced onto the phenyl group.

The alkyl group of 1 to 5 carbons which may have a branched structure is exemplified by the same groups as mentioned above.

In above formulas (8) to (11), $R^{39}$ to $R^{62}$ are each independently a hydrogen atom, a halogen atom, an alkyl group of 1 to 5 carbons which may have a branched structure, a haloalkyl group of 1 to 5 carbons which may have a branched structure, a phenyl group, $OR^{63}$, $COR^{63}$, $NR^{63}R^{64}$, $COOR^{65}$ ($R^{63}$ and $R^{64}$ being each independently a hydrogen atom, an alkyl group of 1 to 5 carbons which may have a branched structure, a haloalkyl group of 1 to 5 carbons which may have a branched structure, or a phenyl group; and $R^{65}$ being an alkyl group of 1 to 5 carbons which may have a branched structure, a haloalkyl group of 1 to 5 carbons which may have a branched structure, or a phenyl group), or a carboxyl group, sulfo group, phosphoric acid group, phosphonic acid group or salt of any thereof.

Here, the haloalkyl group of 1 to 5 carbons which may have a branched structure is exemplified by difluoromethyl, trifluoromethyl, bromodifluoromethyl, 2-chloroethyl, 2-bromoethyl, 1,1-difluoroethyl, 2,2,2-trifluoroethyl, 1,1,2,2-tetrafluoroethyl, 2-chloro-1-1-2-trifluoroethyl, pentafluoroethyl, 3-bromopropyl, 2,2,3,3-tetrafluoropropyl, 1,1,2,3,3,3-hexafluoropropyl, 1,1,1,3,3,3-hexafluoropropan-2-yl, 3-bromo-2-methylpropyl, 4-bromobutyl and perfluoropentyl.

The halogen atom, alkyl group of 1 to 5 carbons which may have a branched structure, and carboxyl group, sulfo group, phosphoric acid group, phosphonic acid group or salt of any thereof are exemplified by the same groups as mentioned for above formulas (2) to (7).

The highly branched polymer of the invention has, in at least one aromatic ring on the repeating units of formula (1) or (2), an acidic group of at least one type selected from among carboxyl groups, sulfo groups, phosphoric acid groups, phosphonic acid groups, and salts thereof.

Particularly in cases where one wishes to enhance the solubility in a hydrophilic solvent such as an alcohol, glycol or glycol ether, it is desirable for the acidic group to take the form of a salt, preferably an aliphatic amine salt.

Illustrative examples of aldehyde compounds which may be used to produce the highly branched polymer of the invention include saturated aliphatic aldehydes such as formaldehyde, paraformaldehyde, acetaldehyde, propionaldehyde, butyraldehyde, isobutyraldehyde, valeraldehyde, capronaldehyde, 2-methylbutyraldehyde, hexanal, undecanal, 7-methoxy-3,7-dimethyloctanal, cyclohexanal, 3-methyl-2-butyraldehyde, glyoxal, malonaldehyde, succinaldehyde, glutaraldehyde and adipaldehyde; unsaturated aliphatic aldehydes such as acrolein and methacrolein; heterocyclic aldehydes such as furfural, pyridine aldehyde and thiophene aldehyde; and aromatic aldehydes such as benzaldehyde, tolylaldehyde, trifluoromethylbenzaldehyde, phenylbenzaldehyde, salicylaldehyde, anisaldehyde, acetoxybenzaldehyde, terephthaldehyde, acetylbenzaldehyde, formylbenzoic acid, methyl formylbenzoate, aminobenzaldehyde, N,N-dimethylaminobenzaldehyde, N,N-diphenylaminobenzaldehyde, naphthaldehyde, anthraldehyde, phenanthraldehyde, phenylacetaldehyde and 3-phenylpropionaldehyde. The use of an aromatic aldehyde is especially preferred.

Ketone compounds which may be used to produce the highly branched polymer of the invention are exemplified by alkyl aryl ketones and diaryl ketones, illustrative examples of which include acetophenone, propiophenone, diphenyl ketone, phenyl naphthyl ketone, dinaphthyl ketone, phenyl tolyl ketone and ditolyl ketone.

The highly branched polymer used in the invention is obtained, as shown in Scheme 1 below, by the condensation polymerization of a triarylamine compound, such as one of formula (A) below that is capable of furnishing the aforementioned triarylamine skeleton, with an aldehyde compound and/or a ketone compound, such as one of formula (B), below in the presence of an acid catalyst.

In cases where a difunctional compound (C) such as a phthaldehyde (e.g., terephthaldehyde) is used as the aldehyde compound, not only does the reaction shown in Scheme 1 arise, the reaction shown in Scheme 2 below also arises, giving a highly branched polymer having a crosslinked structure in which the two functional groups both contribute to the condensation reaction.

Scheme 1

[Chemical Formula 5]

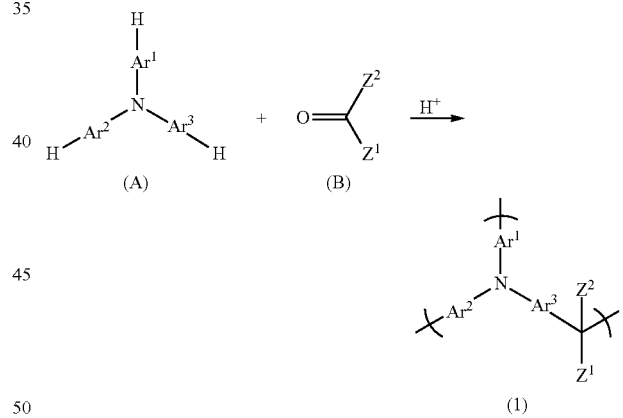

(wherein $Ar^1$ to $Ar^3$ and both $Z^1$ and $Z^2$ are the same as defined above)

Scheme 2

[Chemical Formula 6]

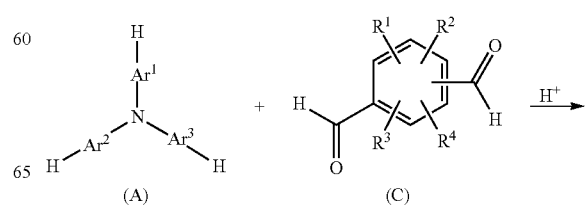

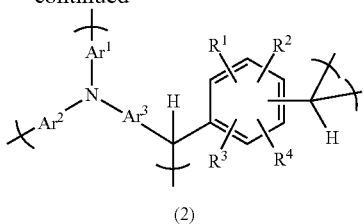

(2)

(wherein Ar¹ to Ar³ and R¹ to R⁴ are the same as defined above)

In the condensation polymerization reaction, the aldehyde compound and/or the ketone compound may be used in a ratio of from 0.1 to 10 equivalents per equivalent of aryl groups on the triarylamine compound.

The acid catalyst used may be, for example, a mineral acid such as sulfuric acid, phosphoric acid or perchloric acid; an organic sulfonic acid such as p-toluenesulfonic acid or p-toluenesulfonic acid monohydrate; or a carboxylic acid such as formic acid or oxalic acid.

The amount of acid catalyst used, although variously selected according to the type thereof, is generally from 0.001 to 10,000 parts by weight, preferably from 0.01 to 1,000 parts by weight, and more preferably from 0.1 to 100 parts by weight, per 100 parts by weight of the triarylamine.

The condensation reaction may be carried out without a solvent, although it is generally carried out using a solvent. Any solvent that does not hinder the reaction may be used for this purpose. Illustrative examples include cyclic ethers such as tetrahydrofuran and 1,4-dioxane; amides such as N,N-dimethylformamide (DMF), N,N-dimethylacetamide (DMAc) and N-methyl-2-pyrrolidone (NMP); ketones such as methyl isobutyl ketone and cyclohexanone; halogenated hydrocarbons such as methylene chloride, chloroform, 1,2-dichloroethane and chlorobenzene; and aromatic hydrocarbons such as benzene, toluene and xylene. These solvents may be used singly, or two or more may be used in admixture. Cyclic ethers are especially preferred.

If the acid catalyst used is a liquid compound such as formic acid, the acid catalyst may also fulfill the role of a solvent.

The reaction temperature during condensation is generally from 40 to 200° C. The reaction time may be variously selected according to the reaction temperature, but is generally from about 30 minutes to about 50 hours.

The weight-average molecular weight Mw of the polymer obtained as described above is generally from 1,000 to 2,000,000, and preferably from 2,000 to 1,000,000.

The acidic groups on the highly branched polymer of the invention may be introduced by a method that involves first introducing the acidic groups onto aromatic rings of the above triarylamine compound, aldehyde compound and ketone compound serving as the polymer starting materials, then using this to synthesize the highly branched polymer; or may be introduced by a method that involves treating the highly branched polymer following synthesis with a reagent that is capable of introducing acidic groups onto the aromatic rings. From the standpoint of ease and convenience of production, use of the latter approach is preferred.

In the latter approach, the technique used to introduce acidic groups onto the aromatic ring is not particularly limited, and may be suitably selected from among various known methods according to the type of acidic group.

For example, in cases where sulfo groups are introduced, use may be made of a method that involves sulfonation using an excess amount of sulfuric acid.

The highly branched polymer of the invention is not limited to use only as a CNT dispersant as described below; it can also be dissolved in various solvents and advantageously used as a film-forming composition.

The solvent used for dissolving the highly branched polymer may be the same as or different from that used during polymerization.

Illustrative examples of such solvents include aromatic hydrocarbons such as toluene, p-xylene, o-xylene, m-xylene, ethylbenzene and styrene; esters such as ethyl acetate, n-propyl acetate, isopropyl acetate, n-butyl acetate, isobutyl acetate, ethyl lactate and γ-butyrolactone; glycol esters such as ethylene glycol monomethyl ether acetate, ethylene glycol monoethyl ether acetate, diethylene glycol monoethyl ether acetate and propylene glycol monomethyl ether is acetate; ethers such as tetrahydrofuran (THF) and 1,4-dioxane; glycol ethers such as ethylene glycol monomethyl ether, ethylene glycol monoethyl ether, ethylene glycol monobutyl ether, ethylene glycol monoisopropyl ether, diethylene glycol monomethyl ether, diethylene glycol monoethyl ether, propylene glycol monomethyl ether, 1-methoxy-2-propanol, propylene glycol monoethyl ether, propylene glycol monobutyl ether, dipropylene glycol monomethyl ether, dipropylene glycol monoethyl ether, 1-methoxy-2-butanol, ethylene glycol dimethyl ether, diethylene glycol dimethyl ether, diethylene glycol diethyl ether and triethylene glycol dimethyl ether; ketones such as acetone, methyl ethyl ketone (MEK), methyl isopropyl ketone, methyl isobutyl ketone (MIBK), methyl n-butyl ketone, diethyl ketone, cyclohexanone and diacetone alcohol; alcohols such as methanol, ethanol, n-propanol, isopropanol, allyl alcohol, n-butanol, isobutanol, tert-butanol, 1-pentanol, 2-methyl-1-butanol, 2-methyl-2-butanol, cyclohexanol, 2-methyl-1-pentanol, 2-ethylhexanol, 1-octanol, benzyl alcohol, furfuryl alcohol and tetrahydrofurfuryl alcohol; glycols such as ethylene glycol, diethylene glycol, trimethylene glycol, propylene glycol, 1,3-butanediol, 1,4-butanediol, 2,3-butanediol and hexylene glycol; amides such as N,N-dimethylformamide (DMF), N,N-dimethylacetamide (DMAc), N-methyl-2-pyrrolidone (NMP), N-cyclohexyl-2-pyrrolidinone, and 1,3-dimethyl-2-imidazolidinone; and sulfoxides such as dimethylsulfoxide (DMSO). These may be used singly or two or more may be used in admixture.

The solids concentration of the film-forming composition is not particularly limited, provided it is in a range that does not adversely affect properties such as storage stability, and may be suitably set in accordance with the target film thickness. More specifically, from the standpoint of solubility and storage stability, the solids concentration is preferably from 0.1 to 50 wt %, and more preferably from 0.1 to 20 wt %.

Aside from a highly branched polymer and a solvent, the film-forming composition of the invention may include also other ingredients such as leveling agents, surfactants and crosslinking agents, provided doing so does not interfere with the advantageous effects of the invention.

The film-forming composition of the invention can be formed into the desired film by application onto a base material, followed by heating if necessary.

The method of applying the composition onto a base material is not particularly limited. For example, use may be made of a method such as spin coating, dipping, flow coating, ink-jet printing, spraying, bar coating, gravure coating, slit coating, roller coating, transfer printing, brush coating, blade coating and air knife coating.

Illustrative examples of the base material include silicon, indium tin oxide (ITO)-coated glass, indium zinc oxide (IZO)-coated glass, poly(ethylene terephthalate) (PET), plastic, glass, quartz and ceramic. Use can also be made of a flexible base material having pliability.

The temperature at which baking is carried out in order to evaporate the solvent is not particularly limited. For example, baking may be carried out at between 40° C. and 400° C. In such cases, to achieve more uniform film formability or to induce the reaction to proceed on the base material, temperature change may be carried out in two or more stages.

The baking process is not particularly limited. For example, baking may be carried out using a hot plate or an oven, and under a suitable atmosphere, such as in open air, in nitrogen or another inert gas, or in a vacuum.

As for the bake temperature and time, conditions which are compatible with the processing steps for the target electronic device should be selected. Bake conditions such that the physical values of the resulting film conform to the required characteristics of the electronic device should be selected.

Because the film made of the inventive film-forming composition that has been obtained as described above is able to achieve a high heat resistance, high transparency, high refractive index, high solubility and low volume shrinkage, it can be advantageously used as a component in the fabrication of electronic devices such as liquid-crystal displays, organic electroluminescent (EL) displays, optical semiconductor (LED) devices, solid-state image sensors, organic thin-film solar cells, dye-sensitized solar cells and organic thin-film transistors (TFT).

The CNT-containing composition according to the invention includes the above-described highly branched polymer (CNT dispersant) and CNTs.

Carbon nanotubes (CNTs) are produced by, for example, an arc discharge process, chemical vapor deposition (CVD) or laser ablation. The CNTs used in this invention may be obtained by any of these methods. CNTs are categorized as single-walled CNTs composed of a single cylindrically rolled graphene sheet (abbreviated below as "SWCNTs"), double-walled CNTs composed of two concentrically rolled graphene sheets (abbreviated below as "DWCNTs"), and multi-walled CNTs composed of a plurality of concentrically rolled graphene sheets (abbreviated below as "MWCNTs"). In this invention, SWCNTs, DWCNTs and MWCNTs may each be used alone or a plurality of these types of CNTs may be used in combination.

When synthesizing SWCNTs, DWCNTs and MWCNTs by the above methods, fullerene, graphite and amorphous carbon form at the same time as by-products, in addition to which catalyst metals such as nickel, iron, cobalt and yttrium remain present. The removal of these impurities and purification is thus sometimes necessary. Acid treatment with nitric acid, sulfuric acid or the like in combination with ultrasonication is effective for removing impurities. In acid treatment with nitric acid, sulfuric acid or the like, the it conjugated system making up the CNTs may be destroyed, resulting in a loss of the inherent properties of the CNTs. Hence, it is desirable to use the CNTs purified under suitable conditions.

The inventive composition may additionally include an organic solvent having the ability to dissolve the above dispersant (highly branched polymer).

Illustrative examples of such organic solvents include ethers such as tetrahydrofuran (THF), diethyl ether and 1,2-dimethoxyethane (DME); halogenated hydrocarbons such as methylene chloride, chloroform and 1,2-dichloroethane; amides such as N,N-dimethylformamide (DMF), N,N-dimethylacetamide (DMAc) and N-methyl-2-pyrrolidone (NMP); ketones such as acetone, methyl ethyl ketone, methyl isobutyl ketone and cyclohexanone; alcohols such as methanol, ethanol, isopropanol and n-propanol; aliphatic hydrocarbons such as n-heptane, n-hexane and cyclohexane; aromatic hydrocarbons such as benzene, toluene, xylene and ethylbenzene; glycol ethers such as ethylene glycol monoethyl ether, ethylene glycol monobutyl ether and propylene glycol monomethyl ether; and glycols such as ethylene glycol and propylene glycol. These organic solvents may be used singly or two or more may be used in combination.

In particular, from the standpoint of being able to increase the proportion of individually dispersed CNTs, the use of NMP, DMF, THF or isopropanol is preferred. In addition, depending on the solvent used, it is desirable to include also, as an additive for enhancing the film formability of the composition, a small amount of, for example, a glycol ether (e.g., ethylene glycol monoethyl ether, ethylene glycol monobutyl ether, propylene glycol monomethyl ether), a ketone (e.g., acetone, methyl ethyl ketone, cyclohexanone), propylene glycol, isopropanol or NMP.

When using the highly branched polymer of the invention (particularly when the acidic group is in the form of a salt), the dispersibility and film-forming properties are good even if a hydrophilic solvent such as an alcohol, a glycol or a glycol ether is used.

Moreover, even when such a hydrophilic solvent is used as a mixed solvent with water, there is no decline in the dispersibility and film-forming properties.

Any suitable method may be used to prepare the inventive composition. In cases where the dispersant (highly branched polymer) is a liquid, the composition may be prepared by suitably mixing the dispersant with the CNTs. In cases where the dispersant is a solid, the composition may be prepared by melting the dispersant, then mixing it with the CNTs.

In cases where an organic solvent is used, the composition may be prepared by mixing together the dispersant, the CNTs and the organic solvent in any order.

The mixture of the dispersant, CNTs and organic solvent is preferably subjected to dispersion treatment; with such treatment, the proportion of individually dispersed CNTs can be increased. Examples of dispersion treatment include the following types of mechanical treatment: wet treatment using a ball mill, bead mill or jet mill, and ultrasonic treatment using a bath-type or probe-type sonicator.

Any suitable dispersion treatment time may be used, although a time of from about 1 minute to about 10 hours is preferred, and a time of from about 5 minutes to about 5 hours is more preferred.

Because the dispersant of the invention has an excellent ability to disperse CNTs, even if heat treatment is not carried out prior to dispersion treatment, it is possible to obtain a composition in which the CNTs have been individually dispersed to a high concentration. However, heat treatment may be carried out if necessary.

The mixing ratio of dispersant and CNTs in the CNT-containing composition of the invention may be set to from about 1,000:1 to about 1:100, by weight.

The concentration of dispersant in a composition containing an organic solvent is not particularly limited, provided it is a concentration that is able to disperse the CNTs in the organic solvent. However, in this invention, the concentration of dispersant in the composition is set to preferably from about 0.001 to about 30 wt %, and more preferably from about 0.002 to about 20 wt %.

In addition, the CNT concentration in this composition is not particularly limited, provided at least some of the CNTs are individually dispersed. However, in this invention, the CNT concentration in the composition is set to preferably from about 0.0001 to about 20 wt %, and more preferably from about 0.001 to about 10 wt %.

In the inventive composition prepared as described above, it is assumed that the dispersant adheres to the surfaces of the CNTs to form a composite.

Alternatively, in the inventive composition, a general-purpose synthetic resin that is soluble in the above organic solvent may be mixed with the other ingredients, and the resulting mixture used to form a composite.

Illustrative examples of the general-purpose synthetic resin include the following thermoplastic resins: polyolefin resins such as polyethylene (PE), polypropylene (PP), ethylene-(vinyl acetate) copolymer (EVA) and ethylene-(ethyl acrylate) copolymer (EEA), polystyrene resins such as polystyrene (PS), high-impact polystyrene (HIPS), acrylonitrile-styrene copolymer (AS), acrylonitrile-butadiene-styrene copolymer (ABS) and (methyl methacrylate)-styrene copolymer (MS), polycarbonate resins, vinyl chloride resins, polyamide resins, polyimide resins, (meth)acrylic resins such as poly(methyl methacrylate) (PMMA), to polyester resins such as poly(ethylene terephthalate) (PET), poly(butylene terephthalate), poly(ethylene naphthalate), poly(butylene naphthalate), poly(lactic acid) (PLA), poly(3-hydroxybutyric acid), polycaprolactone, poly(butylene succinate) and poly(ethylene succinate/adipate), polyphenylene ether resins, modified polyphenylene ether resins, polyacetal resins, polysulfone resins, poly(phenylene sulfide) resins, poly(vinyl alcohol) resins, poly(glycolic acid)s, modified starches, cellulose acetate and cellulose triacetate, chitin and chitosan, and lignin; and the following thermoset resins: phenolic resins, urea resins, melamine resins, unsaturated polyester resins, polyurethane resins, and epoxy resins.

The CNT-containing composition of the invention may also include a crosslinking agent that is soluble in the above-described organic solvent.

Examples of such crosslinking agents include melamine-based crosslinking agents, substituted urea-based crosslinking agents and crosslinking agents which are polymers thereof. These crosslinking agents may be used singly, or two or more may be used in admixture. A crosslinking agent having at least two crosslink-forming substituents is preferred. Illustrative examples of such crosslinking agents include compounds such as CYMEL®, methoxymethylated glycoluril, butoxymethylated glycoluril, methylolated glycoluril, methoxymethylated melamine, butoxymethylated melamine, methylolated melamine, methoxymethylated benzoguanamine, butoxymethylated benzoguanamine, methylolated benzoguanamine, methoxymethylated urea, butoxymethylate urea, methylolated urea, methoxymethylated thiourea, butoxymethylated thiourea and methylolated thiourea, as well as condensates of these compounds.

The amount of crosslinking agent added varies according to such factors as the organic solvent used, the base material used, the required viscosity, and the required film shape. However, the amount of addition with respect to the CNT dispersant (highly branched polymer) is typically from 0.001 to 80 wt %, preferably from 0.01 to 50 wt %, and more preferably from 0.05 to 40 wt %. Although these crosslinking agents do sometimes give rise to crosslinking reactions due to self-condensation, they elicit a crosslinking reaction with the highly branched polymer of the invention. In cases where crosslinkable substituents are present in the highly branched polymer, the crosslinking reaction is promoted by these crosslinkable substituents.

In this invention, an acidic compound (e.g., p-toluenesulfonic acid, trifluoromethanesulfonic acid, pyridinium p-toluenesulfonic acid, salicylic acid, sulfosalicylic acid, citric acid, benzoic acid, hydroxybenzoic acid, naphthalenecarboxylic acid) and/or a thermal acid generator (e.g., 2,4,4,6-tetrabromocyclohexadienone, benzoin tosylate, 2-nitrobenzyl tosylate, alkyl esters of organic sulfonic acids) may be added as the catalyst for promoting the crosslinking reaction.

The amount of catalyst addition with respect to the CNT dispersant (highly branched polymer) is typically from 0.0001 to 20 wt %, preferably from 0.0005 to 10 wt %, and more preferably from 0.001 to 3 wt %.

The inventive composition may be formed into a composite by mixture and melt blending with a resin intended to serve as the matrix.

The resin that becomes the matrix is preferably a thermoplastic resin, and is exemplified by the same thermoplastic resins as those mentioned above for the general-purpose synthetic resin.

In this case, preparation of the composition typically involves melt blending the dispersant, the CNTs and the resin that becomes the matrix in a blending apparatus. Exemplary blending apparatuses include various types of mixers, and single-screw or twin-screw extruders. The blending to temperature and time are not particularly limited, and may be suitably selected according to the resin intended to serve as the matrix.

The CNT concentration in the composition in which a resin that is to serve as the matrix has been used will vary is depending on such factors as the mechanical, electrical and thermal properties desired of the composition, and so is not particularly limited. However, in this invention, the CNT concentration in the composition is set to preferably from about 0.0001 to about 30 wt %, and more preferably from 0.001 to 20 wt %.

The CNT-containing composition (solution) of the invention may be applied and formed into a film on a suitable base material such as PET, glass or ITO by a suitable method, such as spin coating, dipping, flow coating, ink-jet printing, spraying, bar coating, gravure coating, slit coating, roller coating, transfer printing, brush coating, blade coating or air knife coating.

The thin-film thus obtained can be advantageously used in electrically conductive materials that make use of the metallic qualities of CNTs, such as antistatic films and transparent electrodes, and in applications that make use of the semi-conducting qualities of CNTs, such as photoelectric conversion elements and electroluminescence elements.

EXAMPLES

The invention is illustrated more fully below by way of Working Examples and Comparative Examples, although the invention is not limited by these Examples. The equipment and conditions used for preparing samples and for analyzing the properties of the samples were as follows.
(1) Gel Permeation Chromatography (GPC)
   Instrument: HLC-8200 GPC (Tosoh Corporation)
   Columns: Shodex KF-804L+KF-805L
   Column temperature: 40° C.
   Solvent: Tetrahydrofuran
   Detector: UV (254 nm)
   Calibration curve: polystyrene standard (2) Thermogravimetric/Differential Thermal Analyzer (TG-DTA)
  Instrument: TG-8120 (Rigaku Corporation)
  Temperature ramp-up rate: 10° C./min
  Measurement temperatures: 25° C. to 750° C.
(3) UV/Vis Photo-Differential Scanning calorimeter (Photo-DSC)
  Instrument: Photo-DSC 204 F1 Phoenix (from Netzsch)
  Temperature ramp-up rate: 40° C./min
  Measurement temperature: 25° C. to 350° C.
(4) $^1$H-NMR Spectrometer
  Instrument: JNM-ECA700 (from JEOL, Ltd.)
  Solvent used in measurement: DMSO-$d_6$, (deuterated dimethylsulfoxide)
  Reference material: Tetramethylsilane (0.00 ppm)
(5) $^{13}$C-NMR Spectrometer
  Instrument: JNM-ECA700 (from JEOL, Ltd.)
  Solvent used in measurement: DMSO-$d_6$
  Reference material: DMSO-$d_6$ (39.5 ppm)
(6) Ion Chromatography (quantitative analysis of sulfur)
  Instrument: ICS-1500 (Dionex)
  Columns: IonPac AG12A+IonPac AS12A (Dionex)
  Solvent: aqueous solution containing 2.7 mmol/L of $NaHCO_3$+0.3 mmol/L of $Na_2CO_3$
  Detector: Electrical conductivity
(7) Spin Coater
  Apparatus: 1H-D7 (Mikasa KK)
(8) Hot Plate
  Apparatus: ND-2 (As One Corporation)
(9) Probe-Type Ultrasonicator (dispersion treatment)
  Apparatus: UIP1000 (Hielscher Ultrasonics GmbH)
(10) Resistivity Meters (measurement of surface resistivity)
  Instrument A: Loresta GP (Mitsubishi Chemical Corporation)
  Probe: ASP serial 4-pin probe (Mitsubishi Chemical Corporation; inter-pin distance, 5 mm)
  Instrument B: Hiresta UP (Mitsubishi Chemical Corporation)
  Probe: URS ring probe (Mitsubishi Chemical Corporation)
(11) Haze Meter (measurement of total light transmittance)
  Instrument: NDH 5000 (Nippon Denshoku Industries Co., Ltd.)
(12) Ultrasonic Cleaner (dispersion treatment)
  Apparatus: FU-6H (from TGK)
(13) Small High-Speed Refrigerated Centrifuge (centrifugal separation)
  Apparatus: SR$^x$-201 (Tomy Seiko Co., Ltd.)
(14) UV-Visible-Near IR Spectrophotometer (measurement of light absorbance)
  Instrument: SHIMADZU UV-3600 (Shimadzu Corporation)
  Measurement Wavelength: 400 to 1650 nm
(15) Airbrush
  Apparatus: Revolution HP-TR2 (Anest Iwata Corporation)
  Nozzle Size: 0.5 mm
  Bottle Capacity: 15 mL
(16) Wet Jet Mill (dispersion treatment)
  Apparatus: Nano Jet Pal® JN20 (Jokoh KK)
  The meanings of abbreviations used in the Examples are as follows.
  CNT-1: unpurified MWCNTs (C Tube 100, from CNT Co., Ltd.; outside diameter, 10 to 30 nm)
  CNT-2: medium-diameter MWCNTs (VGCF-X, from Showa Denko KK; outside diameter, 15 nm)
  CNT-3: unpurified SWCNTs (HiPco, from Carbon Nanotechnologies)
  CNT-4: purified SWCNTs (from Unidym)
  CNT-5: purified SWCNTs (ASP-100F, from Hanwha Nanotech)
  CNT-6: purified SWCNTs (KH SWCNT80, from KH Chemicals)
  PVP: polyvinylpyrrolidone (K15, from Tokyo Chemical Industry Co., Ltd.; Mw, 10,000)
  Nafion: Nafion® dispersion (No. 510211 from Sigma-Aldrich Co.; 5 wt % Nafion®/50 wt % lower alcohol/45 wt % water)
  BuOH: 1-butanol
  CHN: cyclohexanone
  DMAc: N,N-dimethylacetamide
  DME: 1,2-dimethoxyethane
  EtOH: ethanol
  IPA: isopropanol (2-propanol)
  IPE: diisopropyl ether
  MEK: methyl ethyl ketone
  MeOH: methanol
  NMP: N-methyl-2-pyrrolidone
  PG: propylene glycol
  PGME: propylene glycol monomethyl ether
  PrOH: 1-propanol
  THF: tetrahydrofuran
(1) Synthesis of Dispersants (Triarylamine-Based Highly Branched Polymers)

Synthesis Example 1

Synthesis of the Highly Branched Polymer PTPA-PBA

Under a nitrogen atmosphere, a 1-liter four-neck flask was charged with 80.0 g (326 mmol) of triphenylamine (Zhenjiang Haitong Chemical Industry Co., Ltd.), 118.8 g (652 mmol; 2.0 eq. relative to the triphenylamine) of 4-phenylbenzaldehyde (Mitsubishi Gas Chemical), 12.4 g (65 mmol; 0.2 eq. relative to the triphenylamine) of p-toluenesulfonic acid monohydrate (Konan Chemical Manufacturing Co., Ltd.), and 160 g of 1,4-dioxane. The temperature of this mixture was raised to 85° C. under stirring, thereby effecting dissolution and commencing polymerization. The reaction was carried out for 6 hours, after which the reaction mixture was allowed to cool to 60° C. The reaction mixture was then diluted with 560 g of THF, after which 80 g of 28 wt % ammonia water was added. The resulting reaction solution was poured into a mixed solution of 2,000 g of acetone and 400 g of methanol, and thereby re-precipitated. The precipitate was collected by filtration and dried in vacuo. The resulting solid was re-dissolved in 640 g of THF, then poured into a mixed solution of 2,000 g of acetone and 400 g of water and thereby again re-precipitated. The precipitate was collected by filtration and dried in vacuo for 6 hours at 130° C., yielding 115.1 g of the highly branched polymer PTPA-PBA having repeating units of formula (A) below.

The polystyrene-equivalent weight-average molecular weight Mw of this PTPA-PBA, as measured by GPC, was 17,000, and the polydispersity Mw/Mn was 3.82 (here, Mn represents the number-average molecular weight measured under the same conditions). The 5% weight loss temperature, as measured with a TG-DTA, was 531° C. The glass transition temperature (Tg), as measured by differential scanning calorimetry, was 159° C.

[Chemical Formula 7]

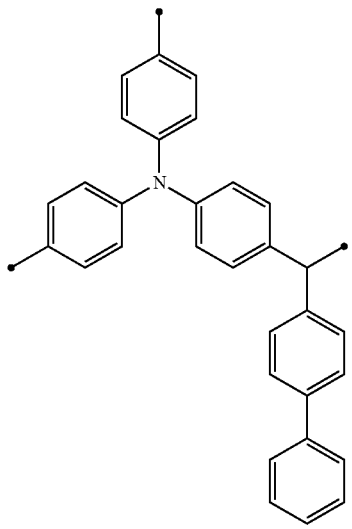

[A]

Example 1

Synthesis of the Highly Branched Polymer PTPA-PBA-SO₃H

Under a nitrogen atmosphere, a 500 mL four-neck flask was charged with 2.0 g of the PTPA-PBA synthesized in Synthesis Example 1 and 50 g of sulfuric acid (Kanto Chemical Co., Ltd.). The temperature of this mixture was raised to 40° C. under stirring, thereby effecting dissolution and commencing sulfonation. After 8 hours of reaction, the temperature of the reaction mixture was raised to 50° C. and the reaction was allowed to proceed for 1 hour more. This reaction mixture was poured into 250 g of pure water, bringing about re-precipitation. The precipitate was collected by filtration, after which 250 g of pure water was added thereto and the precipitate was left at rest for 12 hours. The precipitate was collected by filtration and dried in vacuo for 8 hours at 50° C., yielding 2.7 g of the highly branched polymer PTPA-PBA-SO₃H (referred to below as simply "PTPA-PBA-SO₃H") as a purple powder.

Figure 2:
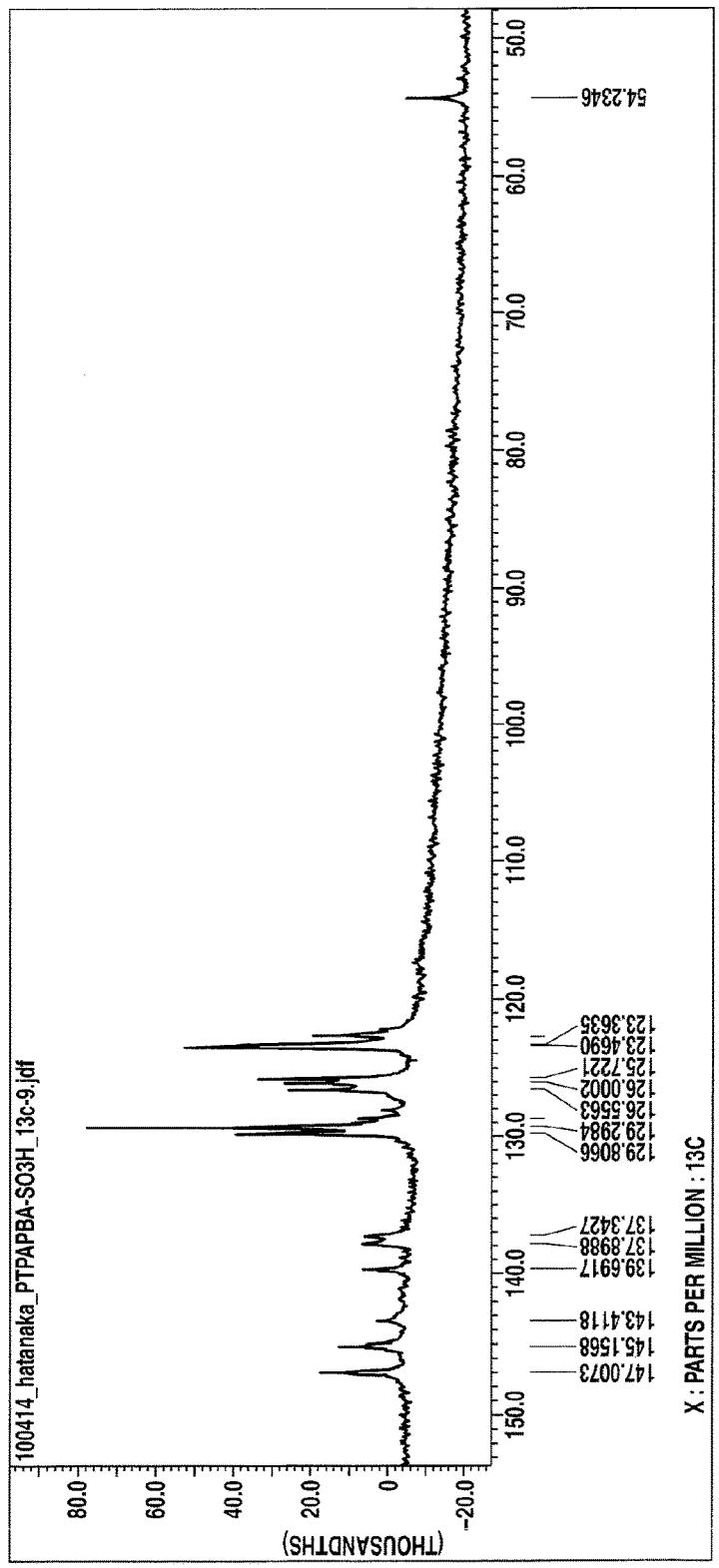
FIG. 2 is an $^{13}$C-NMR spectrum of the PTPA-PBA-SO$_3$H obtained in Example 1.

FIG. 1 shows the ¹H-NMR spectrum of the resulting PTPA-PBA-SO₃H, and FIG. 2 shows the ¹³C-NMR spectrum. The sulfur atom content of the PTPA-PBA-SO₃H, as determined by quantitative analysis of the sulfur, was 6.4%. Based on this result, the sulfo group content of the PTPA-PBA-SO₃H was one sulfo group per repeating unit of the highly branched polymer PTPA-PBA.

Example 15

Synthesis of the Highly Branched Polymer PTPA-PBA-SO₃H-TBA

Under a nitrogen atmosphere, a 50 mL four-neck flask was charged with 2.0 g of the PTPA-PBA-SO₃H synthesized in Example 1 and 18 g of methanol. This mixture was dissolved under stirring at room temperature (about 25° C.), following which 1.5 g (8.2 mmol; 2.0 eq. relative to the sulfonated polymer) of tri-n-butylamine (Kanto Chemical Co., Ltd.) was added dropwise. The reaction was allowed to proceed for 30 minutes, after which the reaction mixture was poured into 200 g of IPE and re-precipitated. The precipitate was collected by filtration and dried in vacuo for 8 hours at 60° C., yielding 2.6 g of the highly branched polymer PTPA-PBA-SO₃H-TBA (referred to below as simply "PTPA-PBA-SO₃H-TBA") as a light-green powder.

Figure 3:
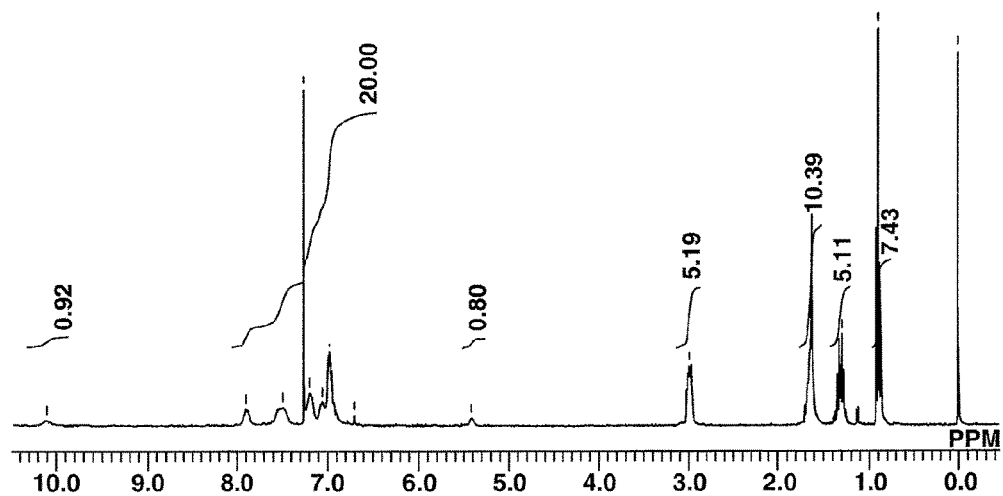
FIG. 3 is an $^1$H-NMR spectrum of the PTPA-PBA-SO$_3$H-TBA obtained in Example 15.

FIG. 3 shows the ¹H-NMR spectrum of the resulting PTPA-PBA-SO₃H-TBA.

Example 16

Synthesis of the Highly Branched Polymer PTPA-PBA-SO₃H-TOA

Aside from changing the amount of methanol used to 8 g and changing the tri-n-butylamine to 2.9 g (8.2 mmol; 2.0 eq. relative to the sulfonated polymer) of tri-n-octylamine, the same procedure was carried out as in Example 15, giving 3.0 g of the highly branched polymer PTPA-PBA-SO₃H-TOA (referred to below as simply "PTPA-PBA-SO₃H-TOA") as a light-green powder.

Figure 4:
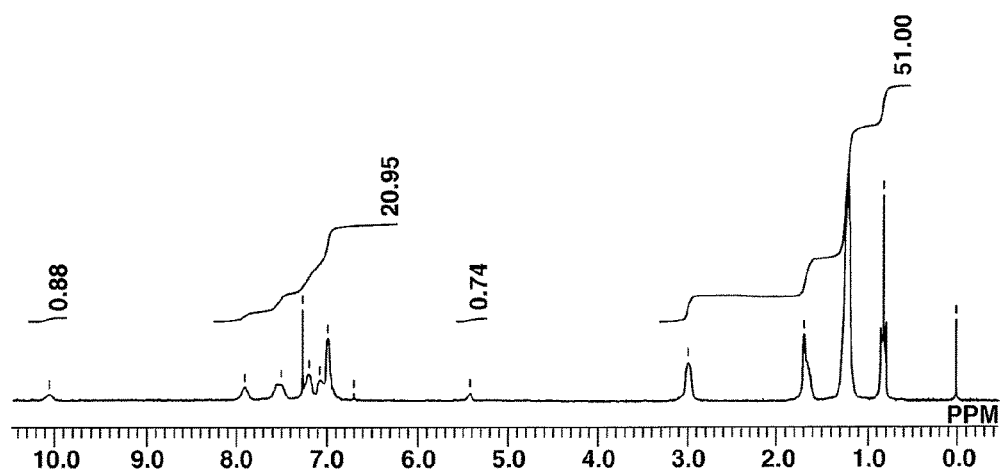
FIG. 4 is an $^1$H-NMR spectrum of the PTPA-PBA-SO$_3$H-TOA obtained in Example 16.

FIG. 4 shows the ¹H-NMR spectrum of the resulting PTPA-PBA-SO₃H-TOA.

(2) Production of Resin Thin-Film

Example 2

The PTPA-PBA-SO₃H obtained in Example 1 was dissolved in a NMP/CHN mixed solution (weight ratio, 1:1) so as to give a resin concentration of 10 wt %. The resulting solution was spin-coated (at 200 rpm for 5 seconds, then at 2,000 rpm for 30 seconds) onto a glass substrate (5×5 cm) to form a film. This applied film was heated for 2 minutes on a 100° C. hot plate, thereby producing a PTPA-PBA-SO₃H thin-film.

Comparative Example 1

Aside from changing the PTPA-PBA-SO₃H to the PTPA-PBA synthesized in Synthesis Example 1 and changing the solvent to CHN, a PTPA-PBA thin-film was produced in the same way as in Example 2.

Comparative Example 2

Aside from changing the PTPA-PBA-SO₃H to PVP, a PVP thin-film was produced in the same way as in Example 2.

The surface resistivities and total light transmittances of the thin-films obtained in Example 2 and in Comparative Examples 1 and 2 were measured. The results are shown in Table 1.

TABLE 1

| | Resin | Surface resistivity (Ω/□) | Total light transmittance (%) |
|---|---|---|---|
| Example 2 | PTPA-PBA-SO₃H | $8.7 \times 10^{10}$ | 96.4 |
| Comparative Example 1 | PTPA-PBA | $>1 \times 10^{33}$ | 100 |
| Comparative Example 2 | PVP | $>1 \times 10^{13}$ | 100 |

As shown in Table 1, the thin-film composed of a sulfo group-containing highly branched polymer (Example 2) was found to have electrical conductivity by itself. By contrast, electrical conductivity was not observed in the thin-film composed of a highly branched polymer without sulfo groups (Comparative Example 1) and in the thin-film composed of the known dispersant PVP (Comparative Example 2). Hence, it is apparent that the highly branched polymer of the invention is advantageous for obtaining a thin-film having a high electrical conductivity.

(3) Production of MWCNT-Containing Compositions and Thin-Films (1)

Example 3

NMP Dispersion Using PTPA-PBA-SO$_3$H (1)

First, 0.50 g of the PTPA-PBA-SO$_3$H synthesized in Example 1 was dissolved as the dispersant in 49.25 g of NMP as the dispersion medium, and 0.25 g of CNT-1 was added as the MWCNTs to the resulting solution. This mixture was subjected to 30 minutes of ultrasonic treatment at room temperature (about 25° C.) using a probe-type ultrasonicator, thereby giving a black MWCNT-containing dispersion in which the MWCNTs were uniformly dispersed and which was free of precipitate.

Next, 0.50 g of CHIN was added as an additive to 2.0 g of the MWCNT-containing dispersion, thereby preparing a coating fluid for thin-film production. Using an applicator having a slit width of 25.4 μm, 50 μL of the resulting coating fluid was uniformly spread on a glass substrate and dried at 100° C. for about 2 minutes, thereby producing a transparent and uniform MWCNT/PTPA-PBA-SO$_3$H composite thin-film.

Example 4

NMP Dispersion Using PTPA-PBA-SO$_3$H (2)

Aside from changing the dispersant to 0.25 g of PTPA-PBA-SO$_3$H and changing the dispersion medium to 49.50 g of NMP, a MWCNT-containing dispersion and a MWCNT/PTPA-PBA-SO$_3$H composite thin-film were produced in the same way as in Example 3.

Example 5

NMP/PrOH/Water Dispersion Using PTPA-PBA-SO$_3$H

Aside from changing the dispersant to 0.25 g of PTPA-PEA-SO$_3$H and changing the dispersion medium to a mixed solvent composed of 44.75 g of NMP, 2.5 g of PrOH and 2.25 g of pure water, a MWCNT-containing dispersion and a MWCNT/PTPA-PBA-SO$_3$H composite thin-film were produced in the same way as in Example 3.

Example 6

MeOH Dispersion Using PTPA-PBA-SO$_3$H

Aside from changing the dispersion medium to 49.25 g of MeOH and changing the additive to 0.50 g of PG, a MWCNT-containing dispersion and a MWCNT/PTPA-PBA-SO$_3$H composite thin-film were produced in the same way as in Example 3.

Example 7

PG Dispersion Using PTPA-PBA-SO$_3$H

Aside from changing the dispersion medium to 49.25 g of PG and not using the additive CHN, a MWCNT-containing dispersion and a MWCNT/PTPA-PBA-SO$_3$H composite thin-film were produced in the same way as in Example 3.

Example 8

PGME/H$_2$O Dispersion Using PTPA-PBA-SO$_3$H

Aside from changing the dispersion medium to a mixed solvent composed of 44.33 g of PGME and 4.93 g of pure water and not using the additive CHN, a MWCNT-containing dispersion and a MWCNT/PTPA-PEA-SO$_3$H composite thin-film were produced in the same way as in Example 3.

Example 9

MeOH/H$_2$O Dispersion Using PTPA-PBA-SO$_3$H

Aside from changing the dispersion medium to a mixed solvent composed of 20.00 g of MeOH and 29.25 g of pure water and changing the additive to 0.50 g of IPA, a MWCNT-containing dispersion and a MWCNT/PTPA-PBA-SO$_3$H composite thin-film were produced in the same way as in Example 3.

Example 10

IPA/H$_2$O Dispersion Using PTPA-PEA-SO$_3$H

Aside from changing the dispersion medium to a mixed solvent composed of 44.33 g of IPA and 4.93 g of pure water and changing the additive to 0.50 g of NMP, a MWCNT-containing dispersion and a MWCNT/PTPA-PBA-SO$_3$H composite thin-film were produced in the same way as in Example 3.

Comparative Example 3

NMP Dispersion Using PTPA-PBA (1)

Aside from changing the dispersant to 0.50 g of the PTPA-PBA synthesized in Synthesis Example 1, a MWCNT-containing dispersion and a MWCNT/PTPA-PBA composite thin-film were produced in the same way as in Example 3.

Comparative Example 4

NMP Dispersion Using PTPA-PBA (2)

Aside from changing the dispersant to 0.25 g of the PTPA-PBA synthesized in Synthesis Example 1 and changing the dispersion medium to 49.50 g of NMP, a MWCNT-containing dispersion and a MWCNT/PTPA-PBA composite thin-film were produced in the same way as in Example 3.

Comparative Example 5

NMP Dispersion Using PVP

Aside from changing the dispersant to 0.25 g of PVP and changing the dispersion medium to 49.50 g of NMP, a MWCNT-containing dispersion and a MWCNT/PVP composite thin-film were produced in the same way as in Example 3.

Comparative Example 6

PG Dispersion Using PVP

Aside from changing the dispersant to 0.50 g of PVP and changing the dispersion medium to 49.25 g of PG, a MWCNT-containing dispersion and a MWCNT/PVP composite thin-film were produced in the same way as in Example 3.

Comparative Example 7

NMP/Lower Alcohol/Water Dispersion Using Nafion

Aside from changing the dispersant to 0.25 g of Nafion (5.00 g of Nafion dispersion) and changing the dispersion medium to 44.75 g of NMP, a MWCNT-containing dispersion and a MWCNT/Nafion composite thin-film were produced in the same way as in Example 3.

Comparative Example 8

PG/Lower Alcohol/Water Dispersion Using Nafion

Aside from changing the dispersant to 0.50 g of Nafion (10.00 g of Nafion dispersion) and changing the dispersion medium to 39.75 g of PG, a MWCNT-containing dispersion and a MWCNT/Nafion composite thin-film were produced in the same way as in Example 3.

The dispersion properties for each of the MWCNT-containing dispersions obtained in Examples 3 to 10 and Comparative Examples 3 to 8, and the thin-film uniformity, surface resistivity and total light transmittance of each of the composite thin-films obtained in these examples were evaluated. The dispersion properties for the dispersions and the thin-film uniformity were visually evaluated according to the criteria indicated below. The results are presented in Table 2.

Dispersion Properties:

State of dispersion after 30 minutes of standing following ultrasonic treatment.
  Good: Uniformly dispersed, with no aggregate-like masses observable whatsoever.
  NG: MWCNT aggregates observable.

Thin-Film Uniformity:
  Good: No aggregate-like masses or film irregularity (shading) observable whatsoever.
  Fair: Some MWCNT aggregates and film irregularities (shading) observable.
  NG: MWCNT aggregates and film irregularities (shading) observable in most places, making evaluation as a film impossible.

hol, alcohol/water, etc.). Hence, by using the dispersant of the invention, dispersions can be prepared using a wide range of solvent systems.

Moreover, compared with PTPA-PBA (Comparative Examples 3 and 4), which lacks sulfo groups, when use is made of the sulfo group-containing dispersants of Examples 3 to 8, the surface resistivity is about one order of magnitude lower (at the level of $10^3 \Omega/\square$), indicating that the inventive dispersants are advantageous for obtaining films having a high electrical conductivity.

Also, although PVP can achieve stable dispersions in both common organic solvents and hydrophilic solvents, the resulting thin-films have a low uniformity (Comparative Examples 5 and 6). Nafion cannot disperse MWCNTs in a common organic solvent (Comparative Example 7), but can achieve a stable dispersion in a hydrophilic solvent, although the film formability is very poor (Comparative Example 8).

(4) Production of MWCNT-Containing Compositions and Thin-Films (2)

Example 11

NMP Dispersion Using PTPA-PBA-SO$_3$H (1)

Aside from changing the MWCNTs to 0.25 g of CNT-2, a MWCNT-containing dispersion and a MWCNT/PTPA-PEA-SO$_3$H composite thin-film were produced in the same way as in Example 3.

Example 12

NMP Dispersion Using PTPA-PEA-SO$_3$H (2)

Aside from changing the dispersant to 0.25 g of PTPA-PBA-SO$_3$H, the dispersion medium to 49.50 g of NMP and

TABLE 2

| | Dispersant | Dispersion medium (weight ratio) | CNT/ dispersant weight ratio | Dispersion properties | Additive | Thin-film uniformity | Surface resistivity ($\Omega/\square$) | Total light transmittance (%) |
|---|---|---|---|---|---|---|---|---|
| Example 3 | PTPA-PBA-SO$_3$H | NMP | 1/2 | good | CHN | good | $4.3 \times 10^3$ | 57.0 |
| Example 4 | PTPA-PBA-SO$_3$H | NMP | 1/1 | good | CHN | good | $4.1 \times 10^3$ | 57.4 |
| Example 5 | PTPA-PBA-SO$_3$H | NMP/PrOH/H$_2$O (44.75/2.50/2.25) | 1/1 | good | CHN | good | $4.0 \times 10^3$ | 58.2 |
| Example 6 | PTPA-PBA-SO$_3$H | MeOH | 1/2 | good | PG | good | $4.4 \times 10^3$ | 54.8 |
| Example 7 | PTPA-PBA-SO$_3$H | PG | 1/2 | good | — | good | $5.8 \times 10^3$ | 52.3 |
| Example 8 | PTPA-PBA-SO$_3$H | PGME/H$_2$O (44.33/4.93) | 1/2 | good | — | good | $4.1 \times 10^3$ | 48.6 |
| Example 9 | PTPA-PBA-SO$_3$H | MeOH/H$_2$O (20.00/29.25) | 1/2 | good | IPA | good | $5.9 \times 10^3$ | 63.5 |
| Example 10 | PTPA-PBA-SO$_3$H | IPA/H$_2$O (44.33/4.93) | 1/2 | good | NMP | good | $3.5 \times 10^3$ | 51.2 |
| Comparative Example 3 | PTPA-PBA | NMP | 1/2 | good | CHN | good | $4.5 \times 10^4$ | 64.5 |
| Comparative Example 4 | PTPA-PBA | NMP | 1/1 | good | CHN | good | $1.6 \times 10^4$ | 62.3 |
| Comparative Example 5 | PVP | NMP | 1/1 | good | CHN | fair | $(1.1 \times 10^4)$ | (65.4) |
| Comparative Example 6 | PVP | PG | 1/2 | good | CHN | fair | $(9.8 \times 10^3)$ | (55.2) |
| Comparative Example 7 | Nafion | NMP/alcohol/H$_2$O (44.75/2.50/2.25) | 1/1 | NG | CHN | — | — | — |
| Comparative Example 8 | Nafion | PG/alcohol/H$_2$O (39.75/5.00/4.50) | 1/2 | good | CHN | NG | — | — |

Note:
Numbers in parentheses under "Surface resistivity" are reference values; in these cases, accurate measurement was impossible due to excessive film irregularity.

As shown in Table 2, the dispersant of the invention is able to stably disperse CNTs not only in common organic solvents (NMP, etc.), but even in hydrophilic solvents (alcohol, alcohol/water, etc.). Hence, by using the dispersant of the MWCNTs to 0.25 g of CNT-2, a MWCNT-containing dispersion and a MWCNT/PTPA-PBA-SO$_3$H composite thin-film were produced in the same way as in Example 3.

Example 17

PrOH Dispersion Using PTPA-PBA-SO$_3$H-TBA

Aside from changing the dispersant to 0.50 g of the PTPA-PBA-SO$_3$H-TBA synthesized in Example 15, the dispersion medium to 49.25 g of PrOH, the MWCNTs to 0.25 g of CNT-2 and the additive to 0.50 g of PG, a MWCNT-containing dispersion and a MWCNT/PTPA-PBA-SO$_3$H-TBA composite thin-film were produced in the same way as in Example 3.

Example 18

PrOH Dispersion Using PTPA-PBA-SO$_3$H-TOA

Aside from changing the dispersant to 0.50 g of the PTPA-PBA-SO$_3$H-TOA synthesized in Example 16, the dispersion medium to 49.25 g of PrOH, the MWCNTs to 0.25 g of CNT-2 and the additive to 0.50 g of PG, a MWCNT-containing dispersion and a MWCNT/PTPA-PBA-SO$_3$H-TOA composite thin-film were produced in the same way as in Example 3.

Comparative Example 9

NMP Dispersion Using PTPA-PBA (1)

Aside from changing the dispersant to 0.50 g of the PTPA-PBA synthesized in Synthesis Example 1 and changing the MWCNTs to 0.25 g of CNT-2, a MWCNT-containing dispersion and a MWCNT/PTPA-PBA composite thin-film were produced in the same way as in Example 3.

Comparative Example 10

NMP Dispersion Using PTPA-PBA (2)

Aside from changing the dispersant to 0.25 g of the PTPA-PBA synthesized in Synthesis Example 1, the dispersion medium to 49.50 g of NMP and the MWCNTs to 0.25 g of CNT-2, a MWCNT-containing dispersion and a MWCNT/PTPA-PBA composite thin-film were produced in the same way as in Example 3.

Comparative Example 11

NMP Dispersion Using PVP

Aside from changing the dispersant to 0.25 g of PVP, the dispersion medium to 49.50 g of NMP and the MWCNTs to 0.25 g of CNT-2, a MWCNT-containing dispersion and a MWCNT/PVP composite thin-film were produced in the same way as in Example 3.

Comparative Example 12

NMP/Lower Alcohol/Water Dispersion Using Nafion

Aside from changing the dispersant to 0.25 g of Nafion (5.00 g of Nafion dispersion), the dispersion medium to 44.75 g of NMP and the MWCNTs to 0.25 g of CNT-2, a MWCNT-containing dispersion and a MWCNT/Nafion composite thin-film were produced in the same way as in Example 3.

The dispersion properties of each of the MWCNT-containing dispersions obtained in Examples 11, 12, 17 and 18 and in Comparative Examples 9 to 12, and the thin-film uniformity, surface resistivity and total light transmittance of each of the composite thin-films obtained in these examples were measured. The dispersion properties of the dispersions and the thin-film uniformity were visually evaluated according to the above-described criteria. The results are presented in Table 3.

TABLE 3

| | Dispersant | Dispersion medium (weight ratio) | CNT/ dispersant weight ratio | Dispersion properties | Additive | Thin-film uniformity | Surface resistivity ($\Omega/\square$) | Total light transmittance (%) |
|---|---|---|---|---|---|---|---|---|
| Example 11 | PTPA-PBA-SO$_3$H | NMP | 1/2 | good | CHN | good | $3.3 \times 10^3$ | 52.4 |
| Example 12 | PTPA-PBA-SO$_3$H | NMP | 1/1 | good | CHN | good | $2.9 \times 10^3$ | 51.7 |
| Example 17 | PTPA-PBA-SO$_3$H-TBA | PrOH | 1/2 | good | PG | good | $5.5 \times 10^3$ | 61.0 |
| Example 18 | PTPA-PBA-SO$_3$H-TOA | PrOH | 1/2 | good | PG | good | $8.4 \times 10^3$ | 63.1 |
| Comparative Example 9 | PTPA-PBA | NMP | 1/2 | good | CHN | good | $2.7 \times 10^4$ | 56.3 |
| Comparative Example 10 | PTPA-PBA | NMP | 1/1 | good | CHN | good | $6.6 \times 10^3$ | 55.4 |
| Comparative Example 11 | PVP | NMP | 1/1 | good | CHN | fair | $(5.4 \times 10^3)$ | (58.5) |
| Comparative Example 12 | Nafion | HMP/alcohol/H$_2$O (44.75/2.50/2.25) | 1/1 | NG | CHN | — | — | — |

Note:
Numbers in parentheses under "Surface resistivity" are reference values; in these cases, accurate measurement was impossible due to excessive film irregularity.

As shown in Table 3, dispersants composed of a highly branched polymer having acidic groups exhibit the same tendencies, regardless of the type of MWCNTs.

(5) Production of SWCNT-Containing Compositions and Thin-Films (1)

Example 13

Dispersion of CNT-3 Using PTPA-PBA-SO$_3$H

First, 1.0 mg of the PTPA-PBA-SO$_3$H synthesized in Example 1 was dissolved as the dispersant in a mixed solvent composed of 5.0 mL of NMP, 10 mg of PrOH and 9 mg of pure water as the dispersion medium, then 0.5 mg of CNT-3 was added as the SWCNTs to the resulting solution. This mixture was subjected to 60 minutes of ultrasonic treatment at room temperature (about 25° C.) using an ultrasonicator. The mixture was then subjected to 60 minutes of centrifugal separation at 10,000 g using a small, high-speed refrigerated centrifuge, thereby giving a SWCNT-containing dispersion as the supernatant.

Figure 5:
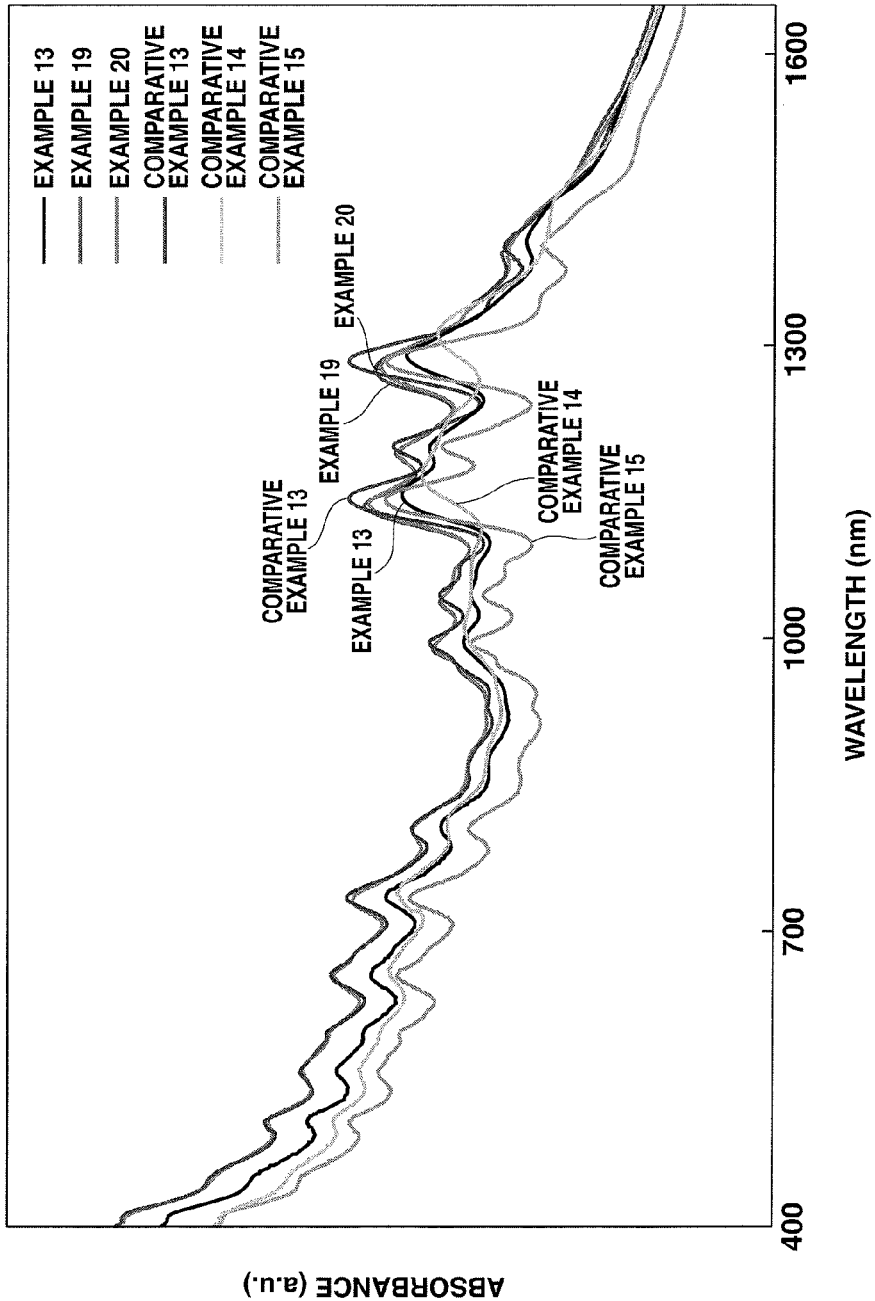
FIG. 5 shows the UV-visible-near IR spectra of the SWCNT-containing dispersions obtained in Examples 13, 19 and 20, and in Comparative Examples 13 to 15.

The UV-visible-near IR spectrum of the SWCNT-containing dispersion obtained was measured, whereupon absorption was clearly observed in the semiconducting S$_1$ band (1,400 to 1,000 nm) and $S_{22}$ band (1,000 to 600 nm) and in the metallic band (600 to 450 nm), thereby confirming that the SWCNTs are dispersed. The results are shown in FIG. 5.

Next, 2 mL of the above SWCNT-containing dispersion was sprayed for 15 to 20 seconds over the entire top surface of a glass substrate heated on a 230° C. hot plate, thereby producing a uniform SWCNT/PTPA-PBA-SO$_3$H composite thin-film. Spraying was carried out using nitrogen at a pressure of 0.2 MPa and from about 20 cm above the substrate being sprayed.

Example 19

Dispersion of CNT-3 Using PTPA-PBA-SO$_3$H-TBA

Aside from changing the dispersant to 1.0 mg of the PTPA-PBA-SO$_3$H-TBA synthesized in Example 15, changing the dispersion medium to 5 mL of PrOH and not carrying out centrifugal separation, a SWCNT-containing dispersion and a SWCNT/PTPA-PBA-SO$_3$H-TBA composite thin-film were produced in the same way as in Example 13.

The UV-visible-near IR spectrum of the SWCNT-containing dispersion obtained was measured, whereupon absorption was clearly observed in the semiconducting $S_{11}$ and $S_{22}$ bands and in the metallic band, thereby confirming that the SWCNTs are dispersed. The UV-visible-near IR spectrum of the SWCNT-containing dispersion obtained also is shown in FIG. 5.

Example 20

Dispersion of CNT-3 Using PTPA-PBA-SO$_3$H-TOA

Aside from changing the dispersant to 1.0 mg of the PTPA-PBA-SO$_3$H-TOA synthesized in Example 16, changing the dispersion medium to 5 mL of PrOH and not carrying out centrifugal separation, a SWCNT-containing dispersion and a SWCNT/PTPA-PBA-SO$_3$H-TOA composite thin-film were produced in the same way as in Example 13.

The UV-visible-near IR spectrum of the resulting SWCNT-containing dispersion was measured, whereupon absorption was clearly observed in the semiconducting $S_{11}$ and $S_{22}$ bands and in the metallic band, thereby confirming that the SWCNTs are dispersed. The UV-visible-near IR spectrum of the SWCNT-containing dispersion obtained also is shown in FIG. 5.

Comparative Example 13

Dispersion of CNT-3 Using PTPA-PBA

Aside from changing the dispersant to 1.0 mg of the PTPA-PBA synthesized in Synthesis Example 1, a SWCNT-containing dispersion and a SWCNT/PTPA-PBA composite thin-film were produced in the same way as in Example 13. The UV-visible-near IR spectrum of the SWCNT-containing dispersion obtained also is shown in FIG. 5.

Comparative Example 14

Dispersion of CNT-3 Using PVP

Aside from changing the dispersant to 1.0 mg of PVP, a SWCNT-containing dispersion and a SWCNT/PVP composite thin-film were produced in the same way as in Example 13. The UV-visible-near IR spectrum of the SWCNT-containing dispersion obtained also is shown in FIG. 5.

Comparative Example 15

Dispersion of CNT-3 Using Nafion

Aside from changing the dispersant to 1.0 mg of Nafion (20 mg of Nafion dispersion) and changing the dispersion medium to 5.0 mL of NMP, a SWCNT-containing dispersion and a SWCNT/Nafion composite thin-film were produced in the same way as in Example 13. The UV-visible-near IR spectrum of the SWCNT-containing dispersion obtained also is shown in FIG. 5.

The surface resistivity and total light transmittance of each of the SWCNT composite thin-films obtained in Examples 13, 19 and 20 and in Comparative Examples 13 to 15 were measured. The results are presented in Table 4.

TABLE 4

| | Dispersant | Surface resistivity (Ω/□) | Total light transmittance (%) |
|---|---|---|---|
| Example 13 | PTPA-PBA-SO$_3$H | 5.7 × 10$^5$ | 96.4 |
| Example 19 | PTPA-PBA-SO$_3$H-TBA | 7.2 × 10$^5$ | 95.8 |
| Example 20 | PTPA-PBA-SO$_3$H-TOA | 6.9 × 10$^6$ | 97.5 |
| Comparative Example 13 | PTPA-PBA | 1.9 × 10$^6$ | 94.8 |
| Comparative Example 14 | PVP | >1 × 10$^{13}$ | 99.8 |
| Comparative Example 15 | Nafion | 3.2 × 10$^9$ | 99.2 |

(6) Production of SWCNT-Containing Compositions and Thin-Films (2)

Example 14

Dispersion of CNT-4 Using PTPA-PEA-SO$_3$H

Aside from changing the SWCNTs to CNT-4, a SWCNT-containing dispersion and a SWCNT/PTPA-PEA-SO$_3$H composite thin-film were produced in the same way as in Example 13.

Figure 6:
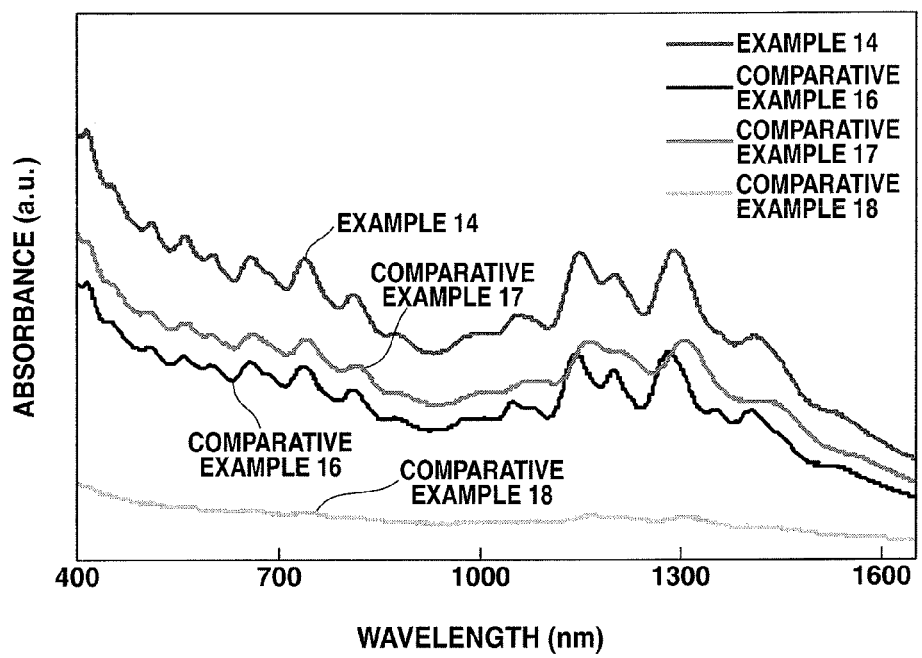
FIG. 6 shows the UV-visible-near IR spectra of the SWCNT-containing dispersions obtained in Example 14 and in Comparative Examples 16 to 18.

The UV-visible-near IR spectrum of the resulting SWCNT-containing dispersion was measured, whereupon absorption was clearly observed in the semiconducting $S_{11}$ band (1,400 to 1,000 nm) and $S_{22}$ band (1,000 to 600 nm) and in the metallic band (600 to 450 nm), thereby confirming that the SWCNTs are dispersed. The results are shown in FIG. 6.

Comparative Example 16

Dispersion of CNT-4 Using PTPA-PBA

Aside from changing the dispersant to 1.0 mg of the PTPA-PBA synthesized in Synthesis Example 1 and changing the SWCNTs to CNT-4, a SWCNT-containing dispersion and a SWCNT/PTPA-PBA composite thin-film were produced in the same way as in Example 13. The UV-visible-near IR spectrum of the SWCNT-containing dispersion obtained also is shown in FIG. 6.

Comparative Example 17

Dispersion of CNT-4 Using PVP

Aside from changing the dispersant to 1.0 mg of PVP and changing the SWCNTs to CNT-4, a SWCNT-containing dispersion and a SWCNT/PVP composite thin-film were produced in the same way as in Example 13. The UV-visible-near IR spectrum of the SWCNT-containing dispersion obtained also is shown in FIG. 6.

Comparative Example 18

Dispersion of CNT-4 Using Nafion

Aside from changing the dispersant to 1.0 mg of Nafion (20 mg of Nafion dispersion) and changing the dispersion medium to 5.0 mL of NMP, a SWCNT-containing dispersion and a SWCNT/Nafion composite thin-film were produced in the same way as in Example 13. The UV-visible-near IR spectrum of the SWCNT-containing dispersion obtained also is shown in FIG. 6.

The surface resistivity and total light transmittance of each of the SWCNT composite thin-films obtained in Example 14 and in Comparative Examples 16 to 18 were measured. The results are presented in Table 5.

TABLE 5

|  | Dispersant | Surface resistivity ($\Omega/\square$) | Total light transmittance (%) |
|---|---|---|---|
| Example 14 | PTPA-PBA-SO$_3$H | $2.4 \times 10^5$ | 95.3 |
| Comparative Example 16 | PTPA-PBA | $1.6 \times 10^6$ | 96.2 |
| Comparative Example 17 | PVP | $4.8 \times 10^5$ | 96.8 |
| Comparative Example 18 | Nafion | $2.9 \times 10^{10}$ | 99.5 |

As shown in Tables 4 and 5, compared with dispersants composed of the highly branched polymer PTPA-PBA without sulfo groups (Comparative Examples 13 and 16), dispersants composed of the sulfo group-containing highly branched polymer PTPA-PBA-SO$_3$H or PTPA-PBA-SO$_3$H-TBA (Examples 13, 14 and 19) resulted in surface resistivities about one order of magnitude lower (at the level of $10^5 \Omega/\square$), indicating that the inventive dispersants are advantageous for obtaining films having a high electrical conductivity.

Also, as shown in FIGS. 5 and 6, it is apparent that the dispersing ability of PVP varies a great deal with the type of SWCNTs, that there are limits on the SWCNTs that can be dispersed thereby (Comparative Examples 14 and 17), and that Nafion is substantially unable to disperse SWCNTs (Comparative Examples 15 and 18).

Poor dispersion properties means that there are numerous CNT aggregates. The presence of such aggregates is a cause of non-uniformity in thin-films, making such films unfit for use in electronic devices. Moreover, in an operation such as spray coating, such aggregates may also clog the nozzle.

Hence, the dispersant of the invention is a novel and useful dispersant which is able to disperse SWCNTs regardless of the type of SWCNTs used, and which can greatly lower the surface resistivity of composite thin-films.

(7) Production of SWCNT-Containing Compositions and Thin-Films (3)

Example 21

Dispersion of CNT-5 Using PTPA-PBA-SO$_3$H (1)

First, 20 mg of the PTPA-PBA-SO$_3$H synthesized in Example 1 was dissolved as the dispersant in a mixed solvent composed of 25 mL of IPA and 25 mL of pure water as the dispersion medium, and 10 mg of CNT-5 was added as the SWCNTs to the resulting solution. Using a wet jet mill, the resulting mixture was subjected to dispersion treatment (20 passes) at room temperature (about 25° C.) and 50 MPa. The treated mixture was centrifuged for 60 minutes at 10,000 g using a small high-speed refrigerator centrifuge, thereby is giving a SWCNT-containing dispersion as the supernatant.

Figure 7:
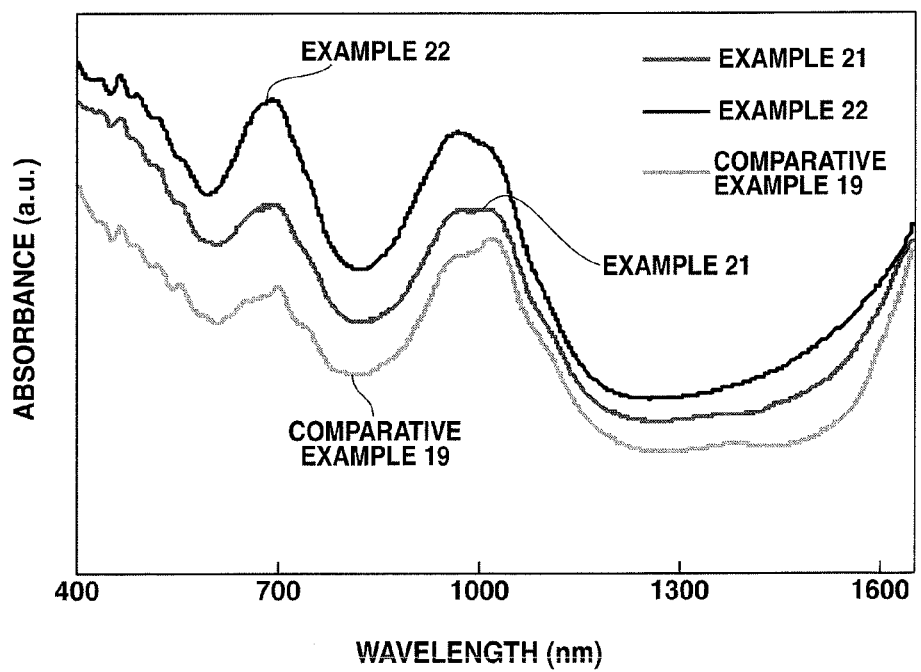
FIG. 7 shows the UV-visible-near IR spectra of the SWCNT-containing dispersions obtained in Examples 21 and 22, and in Comparative Example 19.

The UV-visible-near IR spectrum of the SWCNT-containing dispersion obtained was measured, whereupon absorption was clearly observed in the semiconducting S$_{11}$ and S$_{22}$ bands and in the metallic band, confirming that the SWCNTs are dispersed. The results are shown in FIG. 7.

Next, 2 mL of the SWCNT-containing dispersion was sprayed for 15 to 20 seconds over the entire top surface of a glass substrate heated on a 230° C. hot plate, thereby producing a uniform SWCNT/PTPA-PBA-SO$_3$H composite thin-film. Spraying was carried out using nitrogen at a pressure of 0.2 MPa, and from about 20 cm above the substrate being sprayed.

Example 22

Dispersion of CNT-5 Using PTPA-PBA-SO$_3$H (2)

Aside from changing the dispersion treatment method to 30 minutes of ultrasonic treatment at room temperature (about 25° C.) using a probe-type sonicator, a SWCNT-containing dispersion and a SWCNT/PTPA-PBA-SO$_3$H composite thin-film were produced in the same way as in Example 21. The UV-visible-near IR spectrum of the SWCNT-containing dispersion obtained also is shown in FIG. 7.

Comparative Example 19

Dispersion of CNT-5 Using PTPA-PBA

Aside from changing the dispersant to 20 mg of the PTPA-PBA synthesized in Synthesis Example 1 and changing the dispersion medium to 50 mL of NMP, a SWCNT-containing dispersion and a SWCNT/PTPA-PBA composite thin-film were produced in the same way as in Example 21. The UV-visible-near IR spectrum of the SWCNT-containing dispersion obtained also is shown in FIG. 7.

The surface resistivity and total light transmittance of each of the SWCNT composite thin-films obtained in Examples 21 and 22 and in Comparative Example 19 were measured. The results are presented in Table 6.

TABLE 6

|  | Dispersant | Dispersion treatment | Surface resistivity ($\Omega/\square$) | Total light transmittance (%) |
|---|---|---|---|---|
| Example 21 | PTPA-PBA-SO$_3$H | jet mill | $9.8 \times 10^3$ | 95.6 |
| Example 22 | PTPA-PBA-SO$_3$H | ultrasonication | $4.0 \times 10^3$ | 96.8 |
| Comparative Example 19 | PTPA-PBA | jet mill | $4.1 \times 10^4$ | 95.2 |

(8) Production of SWCNT-Containing Compositions and Thin-Films (4)

Example 23

Dispersion of CNT-6 Using PTPA-PBA-SO$_3$H

Figure 8:
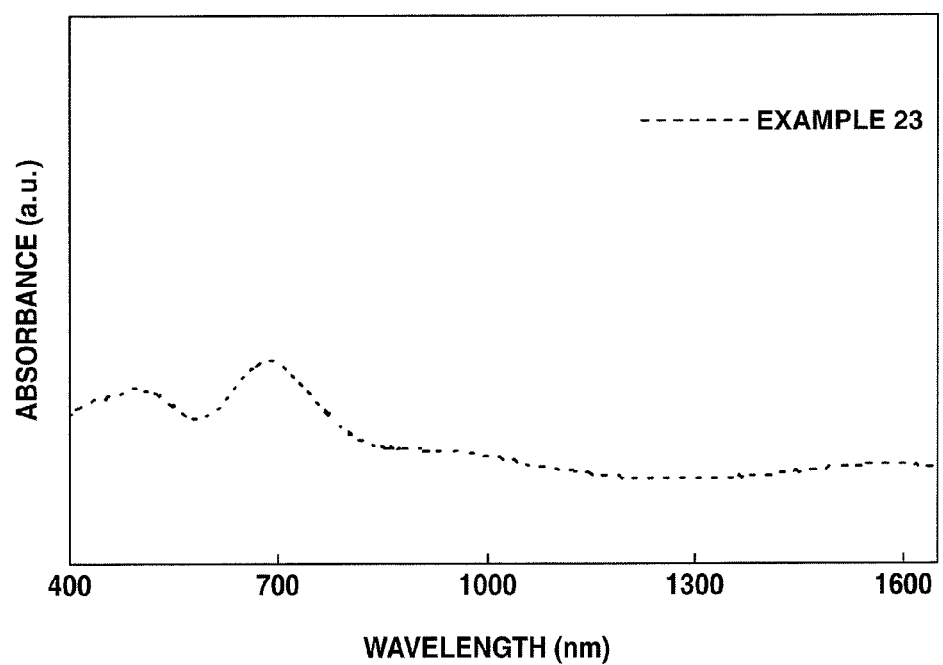
FIG. 8 shows the UV-visible-near IR spectra of the SWCNT-containing dispersion obtained in Example 23.

Aside from changing the SWCNTs to CNT-6, a SWCNT-containing dispersion and a SWCNT/PTPA-PBA-SO$_3$H composite thin-film were produced in the same way as in Example 21. The UV-visible-near IR spectrum of the SWCNT-containing dispersion obtained is shown in FIG. 8.

Also, the surface resistivity and total light transmittance of the SWCNT composite thin-film obtained was evaluated. The results are presented in Table 7.

TABLE 7

| | Dispersant | Dispersion treatment | Surface resistivity ($\Omega/\square$) | Total light transmittance (%) |
|---|---|---|---|---|
| Example 23 | PTPA-PBA-SO$_3$H | jet mill | $3.7 \times 10^4$ | 96.8 |

As shown in Tables 6 and 7, even with dispersion treatment other than ultrasonication, compared with a dispersant composed of the highly branched polymer PTPA-PBA without sulfo groups (Comparative Example 19), when a dispersant according to the invention was used (Example 21), the total light transmittance was about the same, whereas the surface resistivity was about one order of magnitude lower, indicating that the dispersant of the invention is advantageous for obtaining a film having a high electrical conductivity.

In addition, it is apparent from Examples 13 and 14 and also from Examples 21 to 23 that dispersion therein is possible for all the SWCNTs (that is, CNT-3, 4, 5 and 6), and that dispersion can be achieved regardless of the type of SWCNTs.

Hence, the dispersant of the invention is a novel and useful dispersant which is able to disperse SWCNTs regardless of the type of SWCNTs and the dispersion treatment method used, and which can greatly lower the surface resistivity of the composite thin-film.

(9) Solvent Solubilities of Dispersants

Example 24

The solubilities of the various highly branched polymers obtained in Examples 1, 15 and 16 in the various solvents shown in Table 8 were evaluated. This entailed mixing each highly branched polymer with the respective solvents to a concentration of 1 wt % and carrying out 30 minutes of ultrasonic treatment at 25° C., followed by visual evaluation based on the following criteria. The results are shown in Table 8.

Criteria for Evaluating Solubility
 Good: Uniformly dissolved, with no aggregate-like masses observable whatsoever.
 Fair: Some degree of dissolution can be confirmed, but dissolution is incomplete.
 NG: Polymer remains in the form of masses and substantially undissolved.

Comparative Examples 20 and 21

Evaluations like that in Example 24 were carried out for the PTPA-PBA obtained in Synthesis Example 1 and for PVP. The results are shown in Table 8.

TABLE 8

| | PTPA-PBA-SO$_3$H | PTPA-PBA-SO$_3$H-TBA | PTPA-PBA-SO$_3$H-TOA | PTPA-PBA | PVP |
|---|---|---|---|---|---|
| MEK | NG | NG | good | NG | NG |
| CHN | good | fair | good | good | NG |
| DME | NG | NG | fair | NG | NG |
| THF | NG | NG | good | good | NG |
| MeOH | good | good | good | NG | good |
| EtOH | NG | good | good | NG | good |
| PrOH | NG | good | good | NG | good |
| BuOH | NG | good | good | NG | good |
| Chloroform | NG | good | good | good | good |
| DMAc | good | good | good | fair | good |
| NMP | good | good | good | good | good |

The invention claimed is:

1. A highly branched polymer characterized by comprising repeating units of formula (1) or formula (2) below

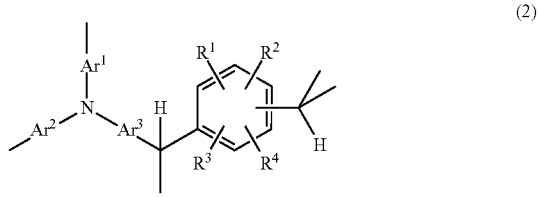

wherein
 Ar$^1$ to Ar$^3$ are each independently a divalent organic group of any one of formulas (3) to (7) below

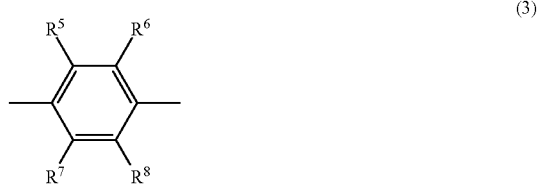

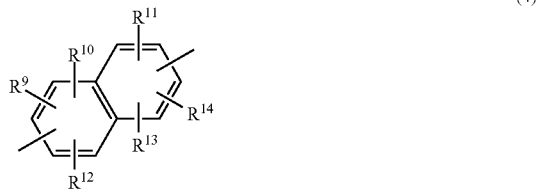

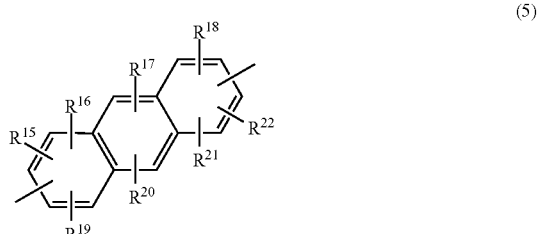

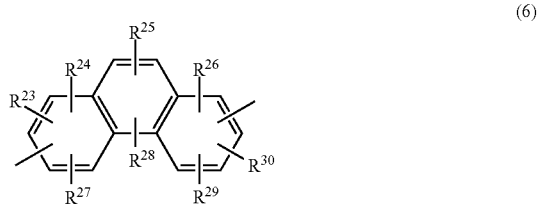

-continued

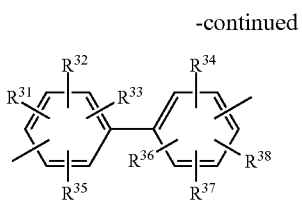
(7)

in which $R^5$ to $R^{38}$ are each independently a hydrogen atom, a halogen atom, an alkyl group of 1 to 5 carbons which may have a branched structure, an alkoxy group of 1 to 5 carbons which may have a branched structure, or a carboxyl group, sulfo group, phosphoric acid group, phosphonic acid group or salt of any thereof;

$Z^1$ and $Z^2$ are each independently a hydrogen atom, an alkyl group of 1 to 5 carbons which may have a branched structure, or a monovalent organic group of any one of formulas (8) to (11) below

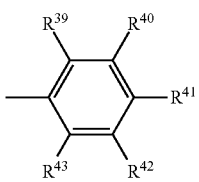
(8)

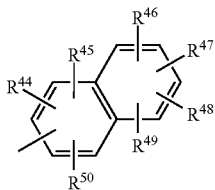
(9)

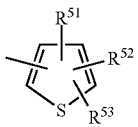
(10)

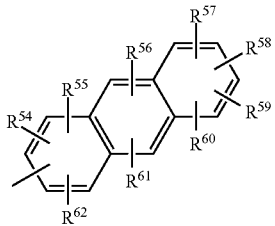
(11)

in which $R^{39}$ to $R^{62}$ are each independently a hydrogen atom, a halogen atom, an alkyl group of 1 to 5 carbons which may have a branched structure, a haloalkyl group of 1 to 5 carbons which may have a branched structure, a phenyl group, $OR^{63}$, $COR^{63}$, $NR^{63}R^{64}$, $COOR^{65}$ ($R^{63}$ and $R^{64}$ being each independently a hydrogen atom, an alkyl group of 1 to 5 carbons which may have a branched structure, a haloalkyl group of 1 to 5 carbons which may have a branched structure, or a phenyl group; and $R^{65}$ being an alkyl group of 1 to 5 carbons which may have a branched structure, a haloalkyl group of 1 to 5 carbons which may have a branched structure, or a phenyl group), or a carboxyl group, sulfo group, phosphoric acid group, phosphonic acid group or salt of any thereof, with the proviso that $Z^1$ and $Z^2$ are not both alkyl groups; and $R^1$ to $R^4$ in formula (2) are each independently a hydrogen atom, a halogen atom, an alkyl group of 1 to 5 carbons which may have a branched structure, an alkoxy group of 1 to 5 carbons which may have a branched structure, or a carboxyl group, sulfo group, phosphoric acid group, phosphonic acid group or salt of any thereof;

with the proviso that at least one type of acidic group selected from among carboxyl groups, sulfo groups, phosphoric acid groups, phosphonic acid groups, and salts thereof is present on at least one aromatic ring of the repeating unit of formula (1) or (2).

2. The highly branched polymer according to claim 1, wherein the repeating units are of formula (12) below

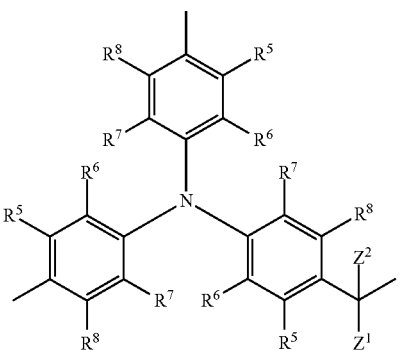
(12)

wherein $R^5$ to $R^8$ are hydrogen atoms, carboxyl groups, sulfo groups, phosphoric acid groups, phosphonic acid groups, or salts thereof; and $Z^1$ and $Z^2$ are as defined above.

3. The highly branched polymer according to claim 1 or 2, wherein $Z^2$ is a hydrogen atom.

4. The highly branched polymer according to claim 3, wherein $Z^1$ is a hydrogen atom, a thienyl group, or a monovalent organic group of formula (8).

5. The highly branched polymer according to claim 1, wherein the acidic group is a sulfo group or a salt thereof.

6. The highly branched polymer according to claim 1 which has a polystyrene-equivalent weight-average molecular weight, as measured by gel permeation chromatography, of from 1,000 to 2,000,000.

7. A film-forming composition containing the highly branched polymer according to claim 1.

8. A film containing the highly branched polymer according to claim 1.

9. A carbon nanotube dispersant comprising the highly branched polymer according to claim 1.

10. A composition comprising the carbon nanotube dispersant of claim 9 and carbon nanotubes.

11. The composition according to claim 10, wherein the carbon nanotube dispersant adheres to surfaces of the carbon nanotubes and forms composite bodies.

12. The composition according to claim 10 or 11 which further comprises an organic solvent.

13. The composition according to claim 12, wherein the carbon nanotubes are individually dispersed in the organic solvent.

14. The composition according to claim 12, wherein the composite bodies are individually dispersed in the organic solvent.

15. The composition according to claim 10, wherein the carbon nanotubes are of at least one type selected from among single-walled carbon nanotubes, double-walled carbon nanotubes, and multi-walled carbon nanotubes.

16. The composition according to claim 12 which further comprises a crosslinking agent that is soluble in the organic solvent.

17. The composition according to claim 16 which further comprises an acid and/or an acid generator.

18. A thin-film obtained from the composition according to claim 10.

19. A cured film obtained by heat-treating a thin-film obtained from carbon nanotubes, an organic solvent, a crosslinking agent which is soluble in said organic solvent, and a carbon nanotube dispersant comprising a highly branched polymer characterized by comprising repeating units of formula (1) or formula (2) below

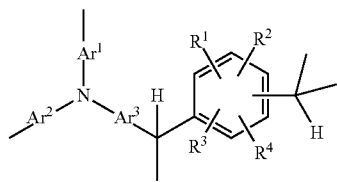

(1)

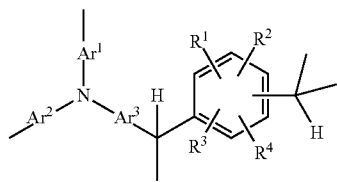

(2)

wherein
Ar$^1$ to Ar$^3$ are each independently a divalent organic group of any one of formulas (3) to (7) below

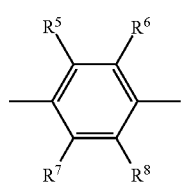

(3)

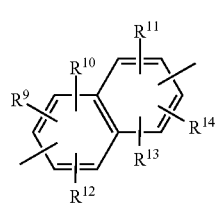

(4)

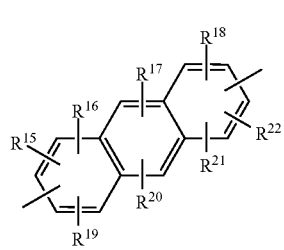

(5)

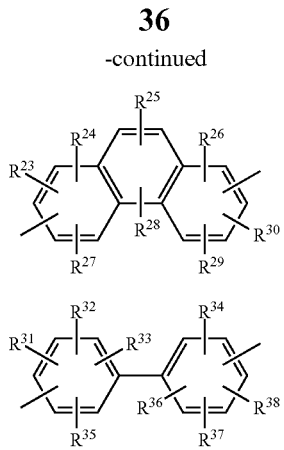

(6)

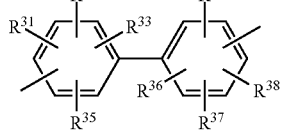

(7)

in which R$^5$ to R$^{38}$ are each independently a hydrogen atom, a halogen atom, an alkyl group of 1 to 5 carbons which may have a branched structure, an alkoxy group of 1 to 5 carbons which may have a branched structure, or a carboxyl group, sulfo group, phosphoric acid group, phosphonic acid group or salt of any thereof;

Z$^1$ and Z$^2$ are each independently a hydrogen atom, an alkyl group of 1 to 5 carbons which may have a branched structure, or a monovalent organic group of any one of formulas (8) to (11) below

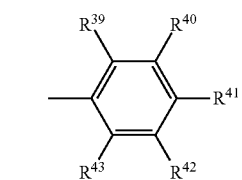

(8)

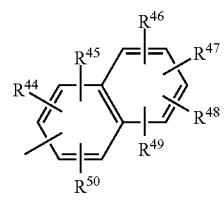

(9)

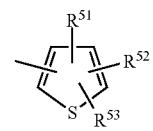

(10)

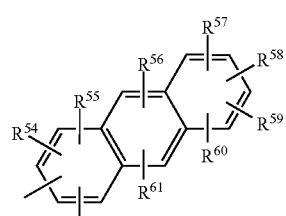

(11)

in which R$^{39}$ to R$^{62}$ are each independently a hydrogen atom, a halogen atom, an alkyl group of 1 to 5 carbons which may have a branched structure, a haloalkyl group of 1 to 5 carbons which may have a branched structure, a phenyl group, OR$^{63}$, COR$^{63}$, NR$^{63}$R$^{64}$, COOR$^{65}$ (R$^{63}$ and R$^{64}$ being each independently a hydrogen atom, an alkyl group of 1 to 5 carbons which may have a branched structure, a haloalkyl group of 1 to 5 carbons which may have a branched structure, or a phenyl group; and $R^{65}$ being an alkyl group of 1 to 5 carbons which may have a branched structure, a haloalkyl group of 1 to 5 carbons which may have a branched structure, or a phenyl group), or a carboxyl group, sulfo group, phosphoric acid group, phosphonic acid group or salt of any thereof, with the proviso that $Z^1$ and $Z^2$ are not both alkyl groups; and $R^1$ to $R^4$ in formula (2) are each independently a hydrogen atom, a halogen atom, an alkyl group of 1 to 5 carbons which may have a branched structure, an alkoxy group of 1 to 5 carbons which may have a branched structure, or a carboxyl group, sulfo group, phosphoric acid group, phosphonic acid group or salt of any thereof;

with the proviso that at least one type of acidic group selected from among carboxyl groups, sulfo groups, phosphoric acid groups, phosphonic acid groups, and salts thereof is present on at least one aromatic ring of the repeating unit of formula (1) or (2).

20. A cured film obtained by heat-treating a thin-film obtained from carbon nanotubes, an organic solvent, a crosslinking agent which is soluble in said organic solvent, and a carbon nanotube dispersant comprising a highly branched polymer characterized by comprising repeating units of formula (1) or formula (2) below

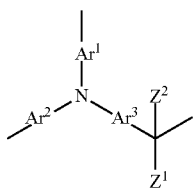

(1)

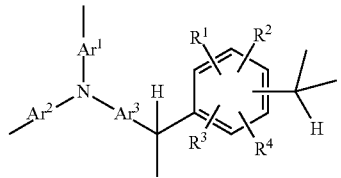

(2)

wherein
Ar$^1$ to Ar$^3$ are each independently a divalent organic group of any one of formulas (3) to (7) below

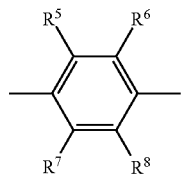

(3)

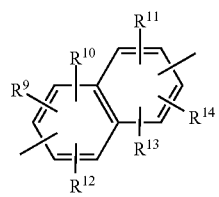

(4)

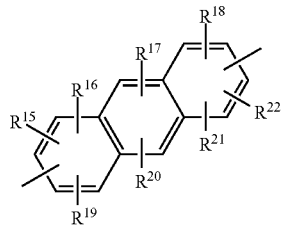

(5)

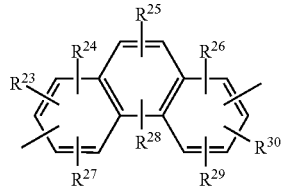

(6)

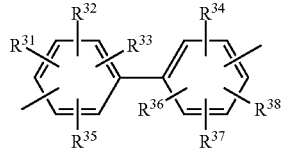

(7)

in which $R^5$ to $R^{38}$ are each independently a hydrogen atom, a halogen atom, an alkyl group of 1 to 5 carbons which may have a branched structure, an alkoxy group of 1 to 5 carbons which may have a branched structure, or a carboxyl group, sulfo group, phosphoric acid group, phosphonic acid group or salt of any thereof;

$Z^1$ and $Z^2$ are each independently a hydrogen atom, an alkyl group of 1 to 5 carbons which may have a branched structure, or a monovalent organic group of any one of formulas (8) to (11) below

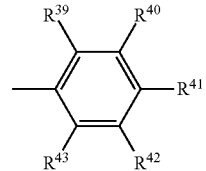

(8)

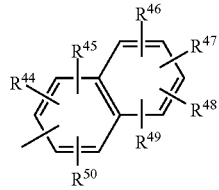

(9)

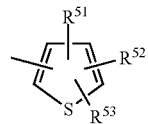

(10)

-continued

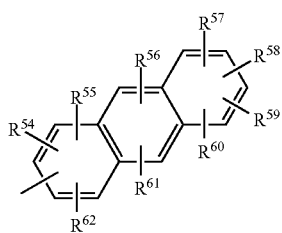
(11)

in which $R^{39}$ to $R^{62}$ are each independently a hydrogen atom, a halogen atom, an alkyl group of 1 to 5 carbons which may have a branched structure, a haloalkyl group of 1 to 5 carbons which may have a branched structure, a phenyl group, $OR^{63}$, $COR^{63}$, $NR^{63}R^{64}$, $COOR^{65}$ ($R^{63}$ and $R^{64}$ being each independently a hydrogen atom, an alkyl group of 1 to 5 carbons which may have a branched structure, a haloalkyl group of 1 to 5 carbons which may have a branched structure, or a phenyl group; and $R^{65}$ being an alkyl group of 1 to 5 carbons which may have a branched structure, a haloalkyl group of 1 to 5 carbons which may have a branched structure, or a phenyl group), or a carboxyl group, sulfo group, phosphoric acid group, phosphonic acid group or salt of any thereof, with the proviso that $Z^1$ and $Z^2$ are not both alkyl groups; and $R^1$ to $R^4$ in formula (2) are each independently a hydrogen atom, a halogen atom, an alkyl group of 1 to 5 carbons which may have a branched structure, an alkoxy group of 1 to 5 carbons which may have a branched structure, or a carboxyl group, sulfo group, phosphoric acid group, phosphonic acid group or salt of any thereof;

with the proviso that at least one type of acidic group selected from among carboxyl groups, sulfo groups, phosphoric acid groups, phosphonic acid groups, and salts thereof is present on at least one aromatic ring of the repeating unit of formula (1) or (2), wherein said carbon nanotube dispersant adheres to surfaces of the carbon nanotubes and forms composite bodies.

21. A method of producing a composition, the method comprising the steps of:
preparing a mixture by mixing together the carbon nanotube dispersant of claim 9, carbon nanotubes and an organic solvent; and
mechanically treating the mixture.

22. The production method of claim 21, comprising the steps of:
preparing the mixture by adding the carbon nanotubes to a solution obtained by dissolving the carbon nanotube dispersant in the organic solvent; and
mechanically treating the mixture.

23. A method of producing a composition, the method comprising the step of
forming a composite by melt-blending the carbon nanotube dispersant of claim 9, carbon nanotubes and a thermoplastic resin.

\* \* \* \* \*